(12) United States Patent
Motoyama et al.

(10) Patent No.: US 7,617,311 B2
(45) Date of Patent: Nov. 10, 2009

(54) METHOD AND SYSTEM OF REMOTE DIAGNOSTIC, CONTROL AND INFORMATION COLLECTION USING A DYNAMIC LINKED LIBRARY OF MULTIPLE FORMATS AND MULTIPLE PROTOCOLS WITH INTELLIGENT PROTOCOL PROCESSOR

(75) Inventors: Tetsuro Motoyama, Cupertino, CA (US); Avery Fong, Castro Valley, CA (US)

(73) Assignee: Ricoh Company Ltd., Tokyo (JP)

( * ) Notice: Subject to any disclaimer, the term of this patent is extended or adjusted under 35 U.S.C. 154(b) by 1262 days.

(21) Appl. No.: 10/857,856

(22) Filed: Jun. 2, 2004

(65) Prior Publication Data

US 2005/0015487 A1 Jan. 20, 2005

Related U.S. Application Data

(63) Continuation of application No. 09/453,935, filed on May 17, 2000, now Pat. No. 7,120,674.

(51) Int. Cl.
*G06F 15/16* (2006.01)
*G06F 15/173* (2006.01)

(52) U.S. Cl. ....................... 709/224; 709/206
(58) Field of Classification Search .............. 709/224, 709/206
See application file for complete search history.

(56) References Cited

U.S. PATENT DOCUMENTS

| | | | |
|---|---|---|---|
| 5,818,603 A * | 10/1998 | Motoyama | 358/296 |
| 5,911,776 A | 6/1999 | Guck | |
| 6,041,041 A | 3/2000 | Ramanathan et al. | |
| 6,317,848 B1 | 11/2001 | Sorens et al. | |
| 6,487,581 B1 | 11/2002 | Spence et al. | |
| 6,539,422 B1 | 3/2003 | Hunt et al. | |
| 6,621,823 B1 | 9/2003 | Mellquist et al. | |
| 7,053,767 B2 | 5/2006 | Petite et al. | |
| 2002/0032802 A1* | 3/2002 | Stiles et al. | 709/310 |
| 2003/0014505 A1 | 1/2003 | Ramberg et al. | |
| 2003/0041093 A1 | 2/2003 | Yamane et al. | |
| 2005/0248792 A1 | 11/2005 | Wright | |

FOREIGN PATENT DOCUMENTS

JP 2-172348 7/1990

OTHER PUBLICATIONS

U.S. Appl. No. 11/437,627, filed May 22, 2006, Motoyama, et al.

(Continued)

*Primary Examiner*—Paul H Kang
(74) *Attorney, Agent, or Firm*—Oblon, Spivak, McClelland, Maier & Neustadt, L.L.P.

(57) ABSTRACT

A method, system and computer program product for (1) collecting information from a remote application unit and/or (2) diagnosing or controlling the remote application unit. By supporting dynamic generation of multiple data formats and/or multiple communication protocols, a computer code device increases the likelihood that a supported format and/or protocol will be either receivable or understandable by a receiver without having to pre-generate the protocol or format processor. By utilizing a shareable computer code device (e.g., a dynamic linked library), a new application can utilize tested, proven code without having to reproduce existing functionality.

12 Claims, 35 Drawing Sheets

OTHER PUBLICATIONS

U.S. Appl. No. 11/940,785, filed Nov. 15, 2007, Motoyama, et al.
U.S. Appl. No. 11/742,939, filed May 1, 2007, Motoyama.
U.S. Appl. No. 11/833,671, filed Aug. 3, 2007, Motoyama, et al.
U.S. Appl. No. 11/867,741, filed Oct. 5, 2007, Motoyama, et al.
U.S. Appl. No. 12/056,014, filed Mar. 26, 2008, Motoyama, et al.
U.S. Appl. No. 12/015,659, filed Jan. 17, 2008, Motoyama, et al.
U.S. Appl. No. 12/029,508, filed Feb. 12, 2008, Motoyama, et al.
U.S. Appl. No. 11/544,560, filed Oct. 10, 2006, Motoyama, et al.
U.S. Appl. No. 11/544,564, filed Oct. 10, 2006, Motoyama, et al.
U.S. Appl. No. 11/544,562, filed Oct. 10, 2006, Motoyama, et al.
U.S. Appl. No. 11/544,688, filed Oct. 10, 2006, Motoyama, et al.
U.S. Appl. No. 11/546,983, filed Oct. 13, 2006, Motoyama, et al.

* cited by examiner

| Return Value | Function Name | Description |
|---|---|---|
| bool | getNextSession | Returns false when there is no more session; true otherwise |
| string | getFileName | Returns file name for the EventData |
| map<string, string> | getSessionInformation | Returns the map. Keys are UserID, ApplicationID, CumulativeSessionNumber, StartTime, and Duration. |
| map<string, vector<string>> | getSessionEventData | Returns the map. Keys are EventName and EventTiming. The values of EventTiming vector are in the unit of 10th of a second converted from unsigned integer to string. |

Figure 12B

| Return Value | Function Name | Description |
|---|---|---|
| bool | getNextLine | Returns one line of string data as an out parameter string. The function returns true if there is a line; false if no more line exists with empty string. |
| string | getFileNameWithSuffix | Returns file name for the data with suffix if applicable |

Figure 12C

```
void CMonitorManager::stopMonitoring()
{
        TRACE("CMonitorManager::stopMonitoring \n");

//  1.  calls the function stopMonitoring() of
//      CUsageLogger.
        m_UsageLogger.stopMonitoring();

//  2.  calls the function getEventData() of
//      CUsageLogger. This function returns the usage
//      information, CAbsEventData, to CMonitorManager.
        CAbsEventData * loc_pAbsEventData = m_UsageLogger.getEventData();

//  3.  calls the function getFormatAndProtocolVector()
//      of CFormatProtocol_InformationBase. This function
//      returns the following to CMonitorManager: an int for
//      the data format, a list<int> for the communication
//      protocols, and a bool to indicate if the return
//      values (format and protocol) are valid.

int loc_nFormat;
        list<int> loc_ProtocolVector;

CProcessorBuilder loc_ProcessorBuilder;

while(m_FormatProtocol_InformationBase.getFormatAndProtocolVector(
                loc_nFormat, loc_ProtocolVector)){

//  4.  calls the function createDataFormatProcessor()
//      of CProcessorBuilder. CMonitorManager passes an
//      int for the data format into this function. This
//      function returns the data format processor,
//      CAbsDataFormatter, to CMonitorManager.

CAbsDataFormatter * loc_pAbsDataFormatter =
                    loc_ProcessorBuilder.createDataFormatProcessor(loc_nFormat);

//  5.  calls the function formatEventData() of
//      CAbsDataFormatter. CMonitorManager passes the
//      usage information, CAbsEventData, into this
//      function. This function returns the formatted
//      usage information, CAbsFormattedEventData, to
//      CMonitorManager.

CAbsFormattedEventData * loc_pAbsFormattedEventData =
                    loc_pAbsDataFormatter->formatEventData(loc_pAbsEventData);

//  6.  calls the function createProtocolProcessor() of
//      CProcessorBuilder. CMonitorManager passes an int
//      for the communication protocol into this function.
//      The int is the first int from the protocol vector,
//      list<int>. This function returns the protocol
//      processor, CAbsProtocolProcessor, to CMonitorManager.

for(list<int>::iterator loc_ProtocolVectorIterator =
                loc_ProtocolVector.begin(); loc_ProtocolVectorIterator NE
                loc_ProtocolVector.end(); loc_ProtocolVectorIterator ++){
```

Figure16A

```
                    CAbsProtocolProcessor * loc_pAbsProtocolProcessor =
                            loc_ProcessorBuilder.createProtocolProcessor(
                            * loc_ProtocolVectorIterator);

//  7.  calls the function processFormattedData() of
//      CAbsProtocolProcessor.  CMonitorManager passes the
//      formatted usage information, CAbsFormattedEventData,
//      into this function.  This function returns a bool to
//      CMonitorManager to indicate if the usage information
//      was communicated using the protocol.

loc_pAbsProtocolProcessor->processFormattedData(
                            loc_pAbsFormattedEventData);

}
//  8.  steps 6 and 7 are repeated for each protocol,
//      int, in the protocol vector, list<int>.
            }
//  9.  steps 3 through 8 are repeated for each format
//      until the function getFormatAndProtocolVector()
//      returns NO to CMonitorManager.
}
```

Figure 16B

Author: Avery Fong
3.3 CProcessorBuilder Class Specification

3.3.1 Function List
public:
  CProcessorBuilder();
  ~CProcessorBuilder();
  CAbsDataFormatter* createDataFormatProcessor(int in_nFormat);
  CAbsProtocolProcessor* createProtocolProcessor(int in_nProtocol);

private:
  void initDataFormatProcessorMap();
  void initProtocolProcessorMap();

Include the following functions to create the different data format processors and protocol processors.
CAbsDataFormatter* createCommaDataFormatter();
CAbsDataFormatter* createXMLDataFormatter();
CAbsProtocolProcessor* createSmtpProtocolProcessor();
CAbsProtocolProcessor* createFtpProtocolProcessor();
If new data formats or new protocols are added, then new functions to create them must be added.

Include the following typedef declarations for the functions that create the data format processors and protocol processors.
typedef CAbsDataFormatter* (*DataFormatProcessorBuilder) ();
typedef CAbsProtocolProcessor* (*ProtocolProcessorBuilder) ();

3.3.2 Class Attributes

| Type | Attribute Name | Description |
|------|----------------|-------------|
| CAbsDataFormatter* | m_pDataFormatter | This attribute member points to the data format processor object. It is initialize to 0 in the constructor and the data format processor object is created by the function createDataFormatProcessor(). This function may be called multiple times so that it must delete the previous data format processor object pointed to by this attribute member before creating a new one. The destructor will delete the last data format processor object pointed to by this attribute member. |
| map<int, DataFormatProcessorBuilder> | m_ProtocolProcessorMap | This attribute member is a map of pointers to functions that create the data format processor. The key to this map is an int for the data format type. The value is a pointer to a function that creates the data format processor corresponding to the key. The pointers to the functions in the map are initialized in the function initDataFormatProcessorMap(). |
| map<int, pair<CAbsProtocolProcessor*, ProtocolProcessorBuilder> > | m_ProtocolProcessorMap | This attribute member is a map of pointers to protocol processor objects and pointers to functions that create them. The key to this map is an int for the protocol processor type. The value is a pair consisting of a pointer to the protocol processor object and a pointer to a function that creates the protocol processor object. All the pointers to the protocol processor object are initialized to 0 and its corresponding functions are initialized by the function initProtocolProcessorMap(). The protocol processor objects are created by the function createProtocolProcessor(). The destructor will delete all the protocol processor objects pointed to by the map. |

Figure 18A

```
3.3.3     Function Definitions
//////////////////////////////////////////////////////////////////////
// Function:        CProcessorBuilder
// Description:     Constructor
// Preconditions:   None.
// Postconditions:  None.
// Algorithm:       1.  calls the private function
//                      initDataFormatProcessorMap().
//                  2.  calls the private function
//                      initProtocolProcessorMap().
//////////////////////////////////////////////////////////////////////

//////////////////////////////////////////////////////////////////////
// Function:        ~CProcessorBuilder
// Description:     Destructor
// Preconditions:   None.
// Postconditions:  None.
// Algorithm:       1.  delete the object pointed to by m_pDataFormatter.
//                  2.  iterate through the map, m_ProtocolProcessorMap.
//                      For each entry in the map, get the protocol
//                      processor object pointed to by the pair and delete
//                      the object.
//////////////////////////////////////////////////////////////////////

//////////////////////////////////////////////////////////////////////
// Function:        createDataFormatProcessor
// Description:     This function creates a data format processor
//                  object.  The data format processor object created
//                  corresponds to the data format type in_nFormat.
// Preconditions:   The data format type must be valid.
// Postconditions:  The pointer to the data format processor object,
//                  m_pDataFormatter, cannot be 0.
// Algorithm:       1.  if m_pDataFormatter currently points to a data
//                      format processor object, then delete the object.
//                  2.  creates a new data format processor object by
//                      calling the function in the map,
//                      m_DataFormatProcessorMap, that corresponds to the
//                      data format type, in_nFormat, and assign it to
//                      m_pDataFormatter.
//                  3.  returns m_pDataFormatter.
//////////////////////////////////////////////////////////////////////

//////////////////////////////////////////////////////////////////////
// Function:        createProtocolProcessor
// Description:     This function creates a protocol processor object.
//                  The protocol processor object created corresponds
//                  to the protocol type in_nProtocol.
// Preconditions:   The protocol type must be valid.
// Postconditions:  The pointer to the created protocol processor object
//                  cannot be 0.
// Algorithm:       1.  for the protocol type, in_nProtocol, get the
//                      pair from the map that contains the pointer to
//                      protocol processor object and its corresponding
//                      pointer to the function that creates it.
//                  2.  if the pointer to the protocol processor object
//                      is 0, then use its corresponding function to create
//                      it and assign it to the pointer in the map.  Return
//                      the pointer to the protocol processor object.
//                  3.  if the pointer points to a protocol processor
//                      object, then return this pointer.
//////////////////////////////////////////////////////////////////////
```

Figure18B

```
///////////////////////////////////////////////////////////////////
// Private
// Function:        initDataFormatProcessorMap
// Description:     This function initializes all the function pointers
//                  in the map m_DataFormatProcessorMap. If new data
//                  formats are added, then this function must be
//                  modified.
// Preconditions:   None.
// Postconditions:  None.
// Algorithm:       1.  add entries to the map, m_DataFormatProcessorMap,
//                  for each data format type.  The key will be the
//                  data format type and the value will be the pointer
//                  to the corresponding function that creates the
//                  data format processor.
//                  2.  for data format type 1, the function pointer
//                  points to createCommaDataFormatter().
//                  3.  for data format type 2, the function pointer
//                  points to createXMLDataFormatter().
///////////////////////////////////////////////////////////////////

///////////////////////////////////////////////////////////////////
// Private
// Function:        initProtocolProcessorMap
// Description:     This function initializes all the pairs of pointers
//                  in the map m_ProtocolProcessorMap. If new protocols
//                  are added, then this function must be modified.
// Preconditions:   None.
// Postconditions:  None.
// Algorithm:       1.  add entries to the map, m_ProtocolProcessorMap,
//                  for each protocol type.  The key will be the
//                  protocol type and the value will be a pointer to
//                  the protocol processor object and a pointer
//                  to the corresponding function that creates the
//                  protocol processor.  All pointers to the protocol
//                  processor objects will be set to 0.
//                  2.  for protocol type 1, the function pointer
//                  points to createSmtpProtocolProcessor().
//                  3.  for protocol type 2, the function pointer
//                  points to createFtpProtocolProcessor().
///////////////////////////////////////////////////////////////////

///////////////////////////////////////////////////////////////////
// Function:        createCommaDataFormatter
// Description:     This function creates and returns a comma data
//                  formatter object.
// Preconditions:   None.
// Postconditions:  The pointer to the created comma data formatter
//                  object cannot be 0.
// Algorithm:       1.  creates and returns an object of the class
//                  CCommaDataFormatter.
///////////////////////////////////////////////////////////////////

///////////////////////////////////////////////////////////////////
// Function:        createXMLDataFormatter
// Description:     This function creates and returns an XML data
//                  formatter object.
// Preconditions:   None.
// Postconditions:  The pointer to the created XML data formatter
//                  object cannot be 0.
// Algorithm:       1.  creates and returns an object of the class
//                  CXMLDataFormatter.
///////////////////////////////////////////////////////////////////
```

Figure 18C

```
///////////////////////////////////////////////////////////////////
// Function:       createSmtpProtocolProcessor
// Description:    This function creates and returns an SMTP protocol
//                 processor object.
// Preconditions:  None.
// Postconditions: The pointer to the created smtp protocol processor
//                 object cannot be 0.
// Algorithm:      1.  creates and returns an object of the class
//                 CSmtpProtocolProcessor.
///////////////////////////////////////////////////////////////////

///////////////////////////////////////////////////////////////////
// Function:       createFtpProtocolProcessor
// Description:    This function creates and returns an FTP protocol
//                 processor object.
// Preconditions:  None.
// Postconditions: The pointer to the created ftp protocol processor
//                 object cannot be 0.
// Algorithm:      1.  creates and returns an object of the class
//                 CFtpProtocolProcessor.
///////////////////////////////////////////////////////////////////
```

Figure 18D

FORMAT AND PROTOCOL INFORMATION BASE PACKAGE CLASS STRUCTURE

5.2 CFormatProtocol_InformationBase Class Specification

5.2.1 Function List

```
public:
   CFormatProtocol_InformationBase();
   ~CFormatProtocol_InformationBase();
   void storeFormatAndProtocol(int in_nFormat, int in_nProtocol);
   bool getFormatAndProtocolVector(int & out_nFormat, list<int> & out_ProtocolVector);

private:
   void setDefaultFormatAndProtocol();
```

5.2.2 Class Attributes

| Type | Attribute Name | Description |
|---|---|---|
| map<int, list<int> > | m_FormatProtocolVectorMap | The key is a format value, and the list is the list of protocol values associated to the key. Because subscripting [] is not needed in this implementation, list is used for the vector implementation. This map is used to return the necessary information for getFormatAndProtocolVector function. Note: > > is > space > to distinguish from ">>" that is used by iostream. |
| map<int, list<int> > | m_ProtocolFormatVectorMap | The key is a protocol value, and the list is the list of format values associated to the key. Because subscripting [] is not needed in this implementation, list is used for the vector implementation. This map is used to modify the map above if the protocol can take only one format. |
| bool | m_bFirstGetCall | This flag is used to call the function in CProtocolRestrictionCheck. The constructor set this to be true. The function, getFormatAndProtocolVector, sets it to be false |
| map<int, list<int> >::iterator | m_FormatProtocolVectorMapIterator | Iterator used to iterate the map. |
| CFormatProtocolCombinationCheck | m_FormatProtocolCombinationCheck | This object is to check the combination of format and protocol |
| CProtocolRestrictionCheck | m_ProtocolRestrictionCheck | This object is to check the protocol restriction. Currently, the only restriction is if protocol can have only one format support. |

5.2.3 Function Definitions

```
///////////////////////////////////////////////////////////////
//Function:        CFormatProtocol_InformationBase
//Description:     Constructor
//Preconditions:   None
//Postconditions:  None
//Algorithm:       Set m_bFirstGetCall to true
///////////////////////////////////////////////////////////////

///////////////////////////////////////////////////////////////
//Function:        ~CFormatProtocol_InformationBase
//Description:     Destructor
//Preconditions:   None
//Postconditions:  None
//Algorithm:       Default
///////////////////////////////////////////////////////////////
```

Figure 23A

```
//////////////////////////////////////////////////////////////
//Function:          storeFormatAndProtocol
//Description:       Check the passed format and protocol values
//                   to be valid or not. If valid, store the
//                   values into the two maps
//Preconditions:     None
//Postconditions:    None
//Algorithm:         1. Send two values to check the combination
//                      through isFormatProtocolCombinationOK
//                      function.
//                   2. Check the return bool value.
//                   3. If yes, save format and protocol values
//                      into two maps (Figure 5.4 of the
//                      Specification, Q6-DJ04-08)
//                      Else, do nothing.
//////////////////////////////////////////////////////////////

//////////////////////////////////////////////////////////////
//Function:          getFormatAndProtocolVector
//Description:       The function returns a format and a list
//                   of protocol values associated with the
//                   format through two parameters. The function
//                   returns true if a format and list are
//                   returned, false otherwise.
//Preconditions:     None
//Postconditions:    The format value is within the range.
//                   The list is not empty and contains the values
//                   within the range.
//Algorithm:         1. If m_bFirstGetCall (Figure 5.5 of the
//                         Specification Q6-DJ04-08)
//                      1.1 call the function to check the protocol
//                          restriction.
//                      1.2 check if m_FormatProtocolVectorMap is
//                          empty. If empty, set it to default
//                          values of format and protocol by calling
//                          setDefaultFormatAndProtocol function.
//                      1.3 set the iterator to begin().
//                      1.4 set m_bFirstGetCall to be false
//                   2. If iterator is end, return false.
//                      else (Figure 5.6 of the Specification
//                            Q6-DJ04-08)
//                         get format and list to return and set
//                         return parameters.
//                         increment iterator.
//                         Return true.
//////////////////////////////////////////////////////////////

//////////////////////////////////////////////////////////////
//Private Function:  setDefaultFormatAndProtocol
//Description:       The function sets the default values for
//                   format and protocol in the map.
//Preconditions:     The m_FormatProtocolVectorMap is empty.
//Postconditions:    The map contains one default format and a
//                   protocol list with one default protocol.
//Algorithm:         Set the map with the default values.
//////////////////////////////////////////////////////////////
```

Figure 23B 5.3 CFormatProtocolCombinationCheck Class Specification 5.3.1 Function List public:
   CFormatProtocolCombinationCheck();
   ~CFormatProtocolCombinationCheck()
   bool isFormatProtocolCombinationOK(const int in_nFormat, const int in_nProtocol);

private:
   void initMatrix();

5.3.2 Class Attributes

| Type | Attribute Name | Description |
| --- | --- | --- |
| map<int, set<int> > | m_CombinationMatrix | Key is the format. The set contains the protocols that are valid for the particular format |

5.3.3 Function Definitions

```
///////////////////////////////////////////////////////////////
//Function:        CFormatProtocolCombinationCheck
//Description:     Constructor
//Preconditions:   None
//Postconditions:  None
//Algorithm:       call initMatrix
///////////////////////////////////////////////////////////////

///////////////////////////////////////////////////////////////
//Function:        ~CFormatProtocolCombinationCheck
//Description:     Destructor
//Preconditions:   None
//Postconditions:  None
//Algorithm:       Default
///////////////////////////////////////////////////////////////

///////////////////////////////////////////////////////////////
//Function:        isFormatProtocolCombinationOK
//Description:     Check the passed format and protocol values
//                 to be valid or not.  If valid, return yes,
//                 no otherwise
//Preconditions:   None
//Postconditions:  None
//Algorithm:       1. Use find function of the Matrix for
//                    in_nFormat
//                 2. If returned iterator is end, return No
//                 3. get the set value for the key format
//                 4. Use the find function of the set for
//                    in_nProtocol
//                 5. if returned iterator is end, return no
//                 6. return yes
///////////////////////////////////////////////////////////////
```

Figure 24A

```
/////////////////////////////////////////////////////////////
//Private Function:   initMatrix
//Description:        This function initializes m_CombinationMatrix.
//                    If new formats or protocols are added, this
//                    function must be modified.
//Precondition:       None
//Postconidition:     None
//Algorithm:          1. Create the local set<int>
//                    2  for each format
//                         2.1 fill in the local set
//                              with the protocol numbers
//                              that are valid for the format,
//                              using insert function
//                         2.2 m_CombinationMatrix[format]
//                              = local set
//                         2.3 clear local set
/////////////////////////////////////////////////////////////
```

Figure 24B 5.4 CProtocolRestrictionCheck Class Specification 5.4.1 Function List public:
   CProtocolRestrictionCheck();
   ~CProtocolRestrictionCheck()
   void getFormatProtocolVectorMapAfterCheckingProtocolRestriction
      (map<int, list<int> > & InOut_Map, const map<int, list<int> > & in_Map);

private:
   void initOneFormatRestriction();
   void oneFormatRestriction
      (map<int, list<int> > & inOut_Map, const map<int, list<int >> & in_Map);

5.4.2 Class Attributes

| Type | Attribute Name | Description |
|---|---|---|
| vector<bool> | m_bOneFormatRestriction | Array size should be protocol size+1. The position corresponds to the protocol. |

5.4.3 Function Definitions

```
///////////////////////////////////////////////////////////////////
//Function:         CProtocolRestrictionCheck
//Description:      Constructor
//Preconditions:    None
//Postconditions:   None
//Algorithm:        call initOneFormatRestriction
///////////////////////////////////////////////////////////////////

///////////////////////////////////////////////////////////////////
//Function:         ~CProtocolRestrictionCheck
//Description:      Destructor
//Preconditions:    None
//Postconditions:   None
//Algorithm:        Default
///////////////////////////////////////////////////////////////////

///////////////////////////////////////////////////////////////////
//Function:         getFormatProtocolVectorMapAfterCheckingProtocolRestriction
//Description:      Check the restriction on the protocol.
//                  Currently, there is only one possible restriction
//                  defined in the requirements. If there are more
//                  restrictions, more private functions should be
//                  added and called.
//Preconditions:    None
//Postconditions:   None
//Algorithm:        1. Call oneFormatRestriction function
///////////////////////////////////////////////////////////////////

```
//Private Function:   initOneFormatRestriction
//Description:        This function initialize the attribute
//                    m_bOneFormatRestriction. If more protocols are
//                    added, this initialization must be modified.
//Preconditions:      None
//Postconditions:     None
//Algorithm:          1. use assign(size+1,false) to initialize the
//                       vector to false.
//                    2. set the entries of true.
//                    Note: for class debug version, use
//                          ifdef and
//                          bool & pos1 = m_bOneFormatRestriction[1];
//                          bool & pos2 = m_bOneFormatRestriction[2];
//                          and so on to be able to see and to
//                          change the value.
////////////////////////////////////////////////////////////////////////

////////////////////////////////////////////////////////////////////////
//Private Function:   oneFormatRestriction
//Description:        This function receives two maps and if the one
//                    restriction is true for given protocol, the
//                    content of inOut_Map (m_FormatProtocolVectorMap)
//                    is adjusted accordingly.
//Preconditions:      None
//Postconditions:     None
//Algorithm:          Iterate over the in_Map (m_ProtocolFormatVectorMap)
//                    1. get the key (pkey)
//                    2. If m_bOneFormatRestriction[pkey]
//                       2.1 get the value list of in_Map for the key
//                       2.2 local int lastFormat = back(),
//                       2.3 iterate over the list
//                           if *iterator NE lastFormat
//                               iterate over inOut_Map[*iterator] list
//                                   if the value EQ pkey
//                                       erase the entry from the list
//                    3. Iterate over inOut_Map
//                       if value list is empty,
//                           erase the entry from inOut_Map
//----------------------------------------------------------------------
//Example:                     0 1 2 3 4
//    m_bOneFormatRestriction = [0,0,1,0,1]  (four protocols)
//                               0: false, 1: true
//    inOut_Map (m_FormatProtocolVectorMap)
//       = ( 1, <1,2,3,4>              --> <1, 2, 3>
//           2, <2,1,3,4>              --> <1, 3>
//           3, <3,4,1,2>              --> <3, 4, 1>
//           4, <2,4>)                 --> <>
//    in_Map (m_ProtocolFormatVectorMap)
//       = (1, <1, 3, 2>
//          2, <4, 3, 2, 1>
//          3, <1, 3, 2>
//          4, <4, 2, 1, 3>)
//
//    pkey = 1  m_bOneFormatRestriction[1] = 0
//    pkey = 2  m_bOneFormatRestriction[2] = 1
//       value list = <4, 3, 2, 1>  (2.1)
//       lastFormat = 1             (2.2)
//       4 !- 1
//           inOut_Map[4] = <2,4>
//           erase value 2     <4>
//       3 !- 1
//           inOut_Map[3] = <3,4,1,2>
//           erase value 2     <3,4,1>
//       2 !-1
//           inOut_Map[2] = <2,1,3,4>
//           erase value 2     <1,3,4>
//       1 -- 1
//    pkey = 3  m_bOneFormatRestriction[3] = 0
```

Figure 25B

```
//   pkey - 4   m_bOneFormatRestriction[4] - 1
//      value list - <4, 2, 1, 3>
//      lastFormat - 3
//      4 != 3
//         inOut_Map[4] - <4>
//         erase value 4  <>
//      2 != 3
//         inOut_Map[2] - <1,3,4>
//         erase value 4   <1,3>
//      1 != 3
//         inOut_Map[1] - <1,2,3,4>
//         erase value 4   <1,2,3>
//      3 -- 3
//   Iterate over inOut_Map
//      if *inOut_Map_iterator.empty() then erase
//
//   inOut_Map
//      - ( 1, <1, 2, 3>
//          2, <1, 3>
//          3, <3, 4, 1>)
//
////////////////////////////////////////////////////////////////
```

Figure 25C

METHOD AND SYSTEM OF REMOTE DIAGNOSTIC, CONTROL AND INFORMATION COLLECTION USING A DYNAMIC LINKED LIBRARY OF MULTIPLE FORMATS AND MULTIPLE PROTOCOLS WITH INTELLIGENT PROTOCOL PROCESSOR

CROSS-REFERENCE TO RELATED APPLICATIONS

The present application is a continuation of application Ser. No. 09/453,935, filed May 17, 2000. The present application is related to the following U.S. applications and patents: Ser. No. 09/453,934 filed 2000-05-17; Ser. No. 09/453,936 filed 2000-05-17; Ser. No. 09/453,937 filed 2000-05-17; Ser. No. 09/440,692 filed 1999-11-16; Ser. No. 09/440,647 filed 1999-11-16, now U.S. Pat. No. 6,662,225; Ser. No. 09/440,646 filed 1999-11-16; Ser. No. 09/440,693 filed 1999-11-16; Ser. No. 09/440,645 filed 1999-11-16; Ser. No. 09/408,443 filed 1999-09-29, now U.S. Pat. No. 6,631,247; Ser. No. 09/407,769 filed 1999-09-29, now U.S. Pat. No. 6,581,092; Ser. No. 09/393,677 filed 1999-09-10; Ser. No. 09/311,148 filed 1999-05-13; Ser. No. 09/192,583 filed 1998-11-17; Ser. No. 09/190,460 filed 1998-11-13, now U.S. Pat. No. 6,208,956; Ser. No. 08/883,492 filed 1997-06-26; Ser. No. 09/108,705 filed 1998-07-01; Ser. No. 09/107,989 filed 1998 Jul. 1, now allowed; Ser. No. 08/997,482 filed 1997-12-23, now U.S. Pat. No. 6,085,196; Ser. No. 08/997,705 filed 1997-12-23, now U.S. Pat. No. 6,279,015; Ser. No. 08/738,659 filed 1996-10-30; Ser. No. 08/738,461 filed 1996-10-30; Ser. No. 09/457,669 filed 1999-12-09; Ser. No. 08/916,009 filed 1997-08-20, now abandoned; Ser. No. 07/902,462 filed 1992-06-19; Ser. No. 07/549,278 filed 1990-07-06; U.S. Pat. Nos. 5,908,493; 5,887,216; 5,818,603; 5,819,110; 5,774,678; 5,649,120; 5,568,618; 5,544,289; 5,537,554; and 5,412,779. The contents of each of those applications and patents is incorporated herein by reference.

BACKGROUND OF THE INVENTION

1. Description of Related Art

With the rise of microprocessor-based appliances and devices, software development has clearly become a significant business. In evaluating and supporting the appliances and devices, it may be beneficial to monitor exactly how events in the appliance and device occur and how the states are changing. An example of events is an action caused by user interaction with an appliance. It may be helpful for a software developer to know which commands a user uses most often and how long those commands take to execute. Such an analysis is often referred to as "profiling." (Analogous analysis was performed on instructions in instruction sets to develop reduced instruction set computing (RISC) instructions.)

Further, in designing devices with which a human interacts, it may be desirable to monitor how the user interacts with such a device. As an example, it may be desirable to monitor how a user utilizes a control panel of an image forming device such as a photocopier, facsimile machine, printer, scanner, an appliance such as a microwave oven, VCR, digital camera, cellular phone, palm top computer, etc.

Further, it may be desirable to monitor the state of the appliances and devices to provide diagnostics, services and maintenances. Some events may be caused by the internal changes within the appliances and devices. Some events may be caused by abnormal conditions such as paper jam in the copiers. Some error conditions and warning conditions may be caused by errors in the software installed in the target appliances and devices.

Further, users are increasingly utilizing the Internet. There is significant interest in how users use the Internet, particularly with respect to how users may use certain web pages. Monitoring a user's usage of the Internet may also become significant.

It may also be desirable to determine how a user is utilizing a certain application unit (e.g., a computer running a software application, a device with an interface to be operated by a user, or a web page). The user's usage of the application unit must be monitored and effectively communicated to a remote party.

2. Field of the Invention

This invention generally relates to a method and system that can monitor and communicate events using multiple protocols. Each of the plural protocols can be defined through the interface function.

BRIEF SUMMARY OF THE INVENTION

One object of the present invention is to provide a novel and effective system for monitoring events of a target application of an application unit.

A further object of the present invention is to provide a system for communicating data obtained by monitoring events of a target application of an application unit to a remote party.

A further object of the present invention is to provide a system for communicating data obtained by monitoring events of a target application of an application unit to a remote party allowing various data formats and communication protocols to facilitate the communication system configuration and received data analysis.

A further object of the present invention is to provide a system for communicating data obtained by monitoring events of a target application of an application unit to a remote party allowing various data formats that ease the analyses of received data at the receiving side.

A further object of the present invention is to efficiently communicate the monitored event information to a transmission unit.

A further object of the present invention is to efficiently verify the combination of the two parameters specifying the format and protocol and to meet the restriction requirement on the second parameter.

The present invention achieves these and other objects by monitoring the events of a target application of an application unit. Monitoring examples include (1) monitoring a software program being executed on a computer or workstation under control of a user, (2) monitoring usage of a control panel of an image forming apparatus (e.g., a copying machine, printer, facsimile, or scanner), an appliance (e.g., a microwave oven, VCR, digital camera, cellular phone, or palm top computer), (3) monitoring any internal state changes such as error conditions and warning conditions within appliances, devices and any systems and sending the results when requested or when events occur or when preset time interval occurs, (4) externally monitoring states of appliances, devices or system by polling at regular interval, and (5) generally monitoring any other device or service. The data obtained by monitoring events of a target application of an application unit, appliance, or device can, as a further feature in the present invention, be collected, logged and communicated to a desired location by a store-and-forward protocol (e.g., Internet e-mail) or a "direct" connection protocol in which a socket connection is made to an ultimate destination machine (e.g., using FTP or HTTP). The use of store-and-forward communication reduces the costs associated with communicating such data. The data can be communicated to the desired location at several instances. Such instances include each time a user exits a target application, or after a predetermined number of times that a user has utilized and exited the target application of the application unit. If the configuration allows and if necessary, the direct connection between the monitored application and the monitoring system can be established in addition to the store-and-forward communication.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 12B is an exemplary EventData class interface for use in the architecture of FIG. 12A;

FIG. 12C is an exemplary FormattedEventData class interface for use in the architecture of FIG. 12A;

FIGS. 16A and 16B shows the source code that implements the processing shown in FIG. 14;

FIGS. 18A through 18D show a Processor Builder class according to one embodiment of the present invention;

FIGS. 23A and 23B are class specification of CFormatProtocol_InformationBase class that interface with the System Manager computer code device;

FIGS. 24A and 24B are class specification of CFormatProtocolCombinationCheck class to verify the combination of format and protocol; and FIGS. 25A, 25B and 25C are class specification of CProtocolRestrictionCheck class where the steps in the oneFormatRestriction function shows the process to modify the map structure.

DETAILED DESCRIPTION OF THE INVENTION

Figure 1:
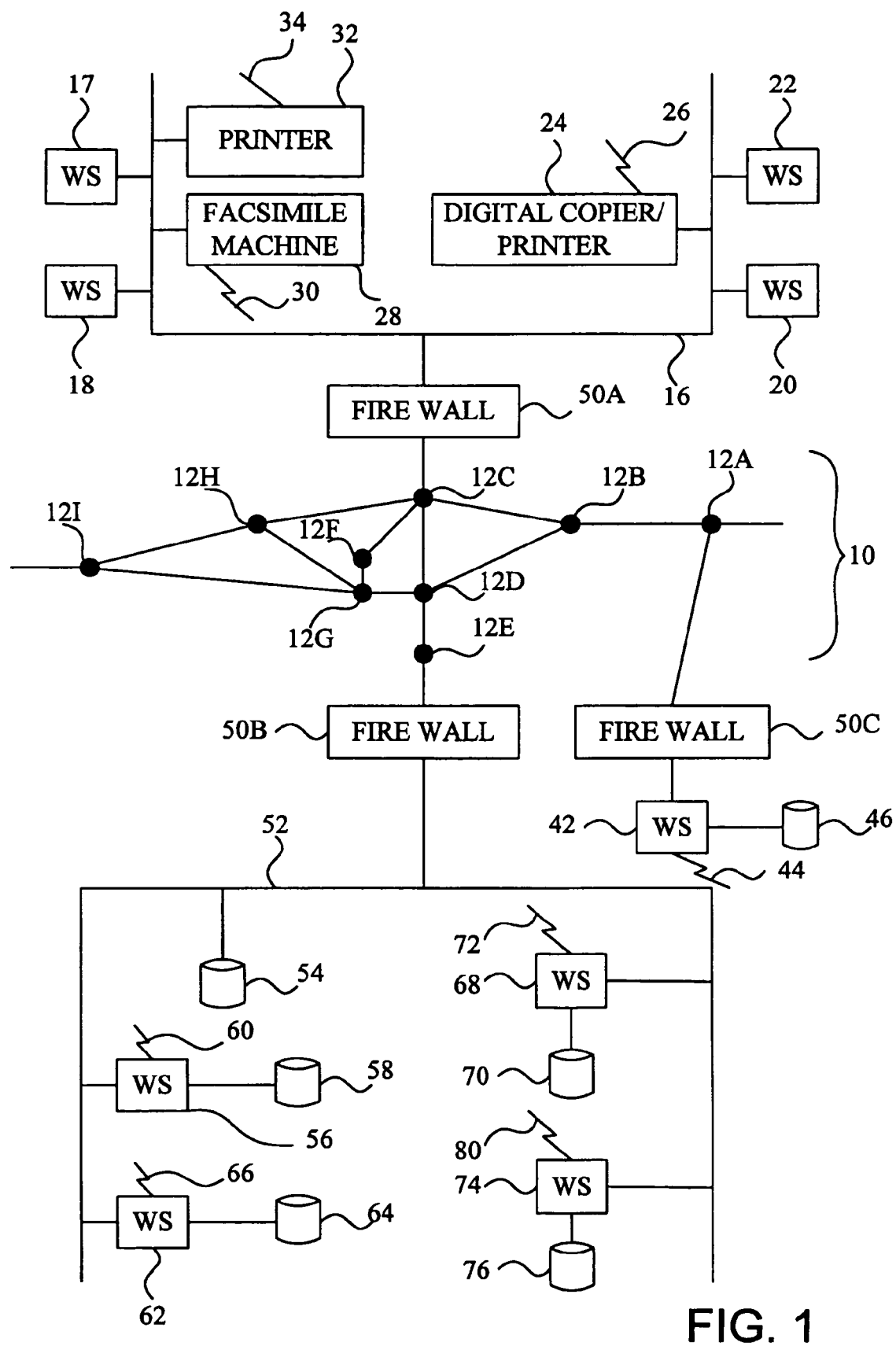
FIG. 1 illustrates three networked business office machines connected to a network of computers and databases through the Internet.

Referring now to the drawings, wherein like reference numerals designate identical or corresponding parts throughout the several views, FIG. 1 illustrates (1) various machines and (2) computers for monitoring, diagnosing and controlling the operation of the machines. In FIG. 1, there is a first network 16, such as a Local Area Network (LAN) connected to computer workstations 17, 18, 20 and 22. The workstations can be any type of computers including IBM Personal Computer compatible devices, Unix-based computers, or Apple Macintoshes. Also connected to the network 16 are (1) a digital image forming apparatus 24, (2) a facsimile machine 28, and (3) a printer 32. As would be appreciated by one of ordinary skill in the art, two or more of the components of the digital image forming apparatus 24 and the facsimile machine 28 can be combined into a unified "image forming apparatus." The devices 24, 28 and 32 and the workstations 17, 18, 20 and 22 are referred to as machines or monitored devices and other types of devices may be used as the machines or monitored devices, including any of the devices discussed below. In some configurations, one or more workstations may be converted to business office appliance. One example of such appliance is eCabinet from Ricoh demonstrated at Fall Comdex in 1999 at Las Vegas. Also, a facsimile server (not illustrated) may be connected to the network 16 and have a telephone, ISDN (Integrated Services Digital Network), cable or wireless connection. In addition to the digital image forming apparatus 24, facsimile machine 28, and printer 32 being connected to the network 16, these devices may also include conventional telephone and/or ISDN and/or cable and/or wireless connections 26, 30 and 34, respectively. As is explained below, the business office machines, business devices or business office appliances 24, 28 and 32 communicate with a remote monitoring, diagnosis and control station, also referred to as a monitoring device, through the Internet via the network 16 or by a direct telephone, ISDN, wireless, or cable connection.

In FIG. 1, a wide area network (WAN) (e.g., the Internet or its successor) is generally designated by 10. The WAN 10 can either be a private WAN, a public WAN or a hybrid. The WAN 10 includes a plurality of interconnected computers and routers designated by 12A-12I. The manner of communicating over a WAN is known through a series of RFC documents obtained by HTTP//:www.ietf.org/rfc.html, including RFC 821 entitled "Simple Mail Transfer Protocol"; RFC 822 entitled "Standard for the Format of ARPA Internet Text Message"; RFC 959 entitled "File Transfer Protocol (FTP)"; RFC 2045 entitled "Multipurpose Internet Mail Extensions (MIME) Part One: Format of Internet Message Bodies"; RFC 1894 entitled "An Extensible Message Format for Delivery Status Notifications"; RFC 1939 entitled "Post Office protocol—Version 3"; and RFC 2298 entitled "An Extensible Message Format for Message Disposition Notifications." The contents of each of those references are incorporated herein by reference.

TCP/IP related communication is described, for example, in the book "TCP/IP Illustrated," Vol. 1, The Protocols, by W. R. Stevens, from Addison-Wesley Publishing Company, 1994, which is incorporated herein by reference. Volumes 1-3 of "Internetworking with TCP/IP" by Corner and Stevens are also incorporated herein by reference in their entirety.

In FIG. 1, a firewall 50A is connected between the WAN 10 and the network 16. A firewall is a device that allows only authorized computers on one side of the firewall to access a network, computers or individual parts on the other side of the firewall. Firewalls are known and commercially available devices and/or software (e.g., SunScreen from Sun Microsystems Inc.). Similarly, firewalls 50B and 50C separate the WAN 10 from a network 52 and a workstation 42, respectively. Additional details on firewalls can be found in "Firewalls and Internet Security" by W. R. Cheswick, and S. M. Bellovin, 1994, Addison-Wesley Publishing, and "Building Internet Firewalls" by D. B. Chapman and E. D. Zwicky, 1995, O'Reilly & Associates, Inc. The contents of those references are incorporated herein by reference.

The network 52 is a conventional network and includes a plurality of workstations 56, 62, 68 and 74. These workstations may be in different departments (e.g., marketing, manufacturing, design engineering and customer service departments) within a single company. In addition to the workstations connected via the network 52, there is a workstation 42, which is not directly connected to the network 52. Information in a database stored in a disk 46 may be shared using proper encryption and protocols over the WAN 10 to the workstations connected directly to the network 52. Also, the workstation 42 includes a direct connection to a telephone line and/or ISDN and/or cable and/or wireless network 44 and the database in disk 46 may be accessed through the telephone line, ISDN, cable or wirelessly. The cable used by this invention may be implemented using a cable which typically is used to carry television programming, a cable which provides for high speed communication of digital data typically used with computers or the like, or any other desired type of cable.

Information of the business office machines, business devices or business office appliances 24, 28 and 32 may be stored in one or more of the databases stored in the disks 46, 54, 58, 64, 70 and 76. Known databases include (1) SQL databases by Microsoft, Oracle and Sybase (2) other relational databases, and (3) non-relational databases (including object oriented databases). Each of the customer service, marketing, manufacturing, and engineering departments may have their own database or may share one or more databases. Each of the disks used to store databases is a non-volatile memory such as a hard disk or optical disk. Alternatively, the databases may be stored in any storage device including solid state and/or semiconductor memory devices. As an example, disk 64 contains the marketing database, disk 58 contains the manufacturing database, disk 70 contains the engineering database and disk 76 contains the customer service database. Alternatively, the disks 54 and 46 store one or more of the databases.

In addition to the workstations 56, 62, 68, 74 and 42 being connected to the WAN, these workstations may also include a connection to a telephone line, ISDN, cable, or wireless network which provides a secure connection to the machine being monitored, diagnosed and/or controlled and is used during communication. Additionally, if one communication medium is not operating properly, one of the others can be automatically used for communication.

A feature of the present invention is the use of a "store-and-forward" mode of communication (e.g., Internet e-mail) or transmission between a machine and a computer for diagnosing and controlling the machine. Alternatively, the message which is transmitted may be implemented using a mode of communication that makes direct, end-to-end connections (e.g., using a socket connection to the ultimate destination).

Figure 2:
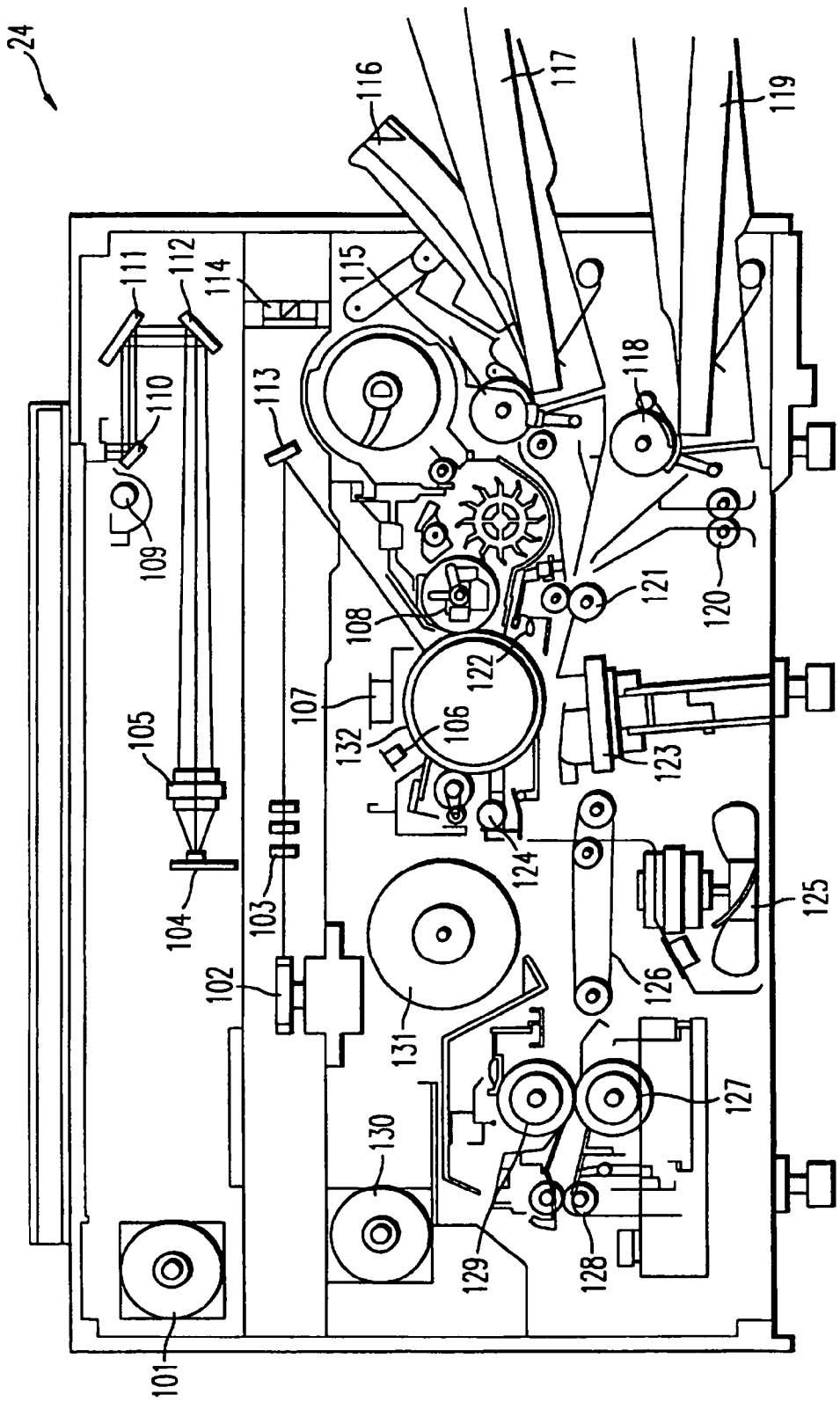
FIG. 2 illustrates the components of a digital image forming apparatus.

FIG. 2 illustrates the mechanical layout of the digital image forming apparatus 24 illustrated in FIG. 1. In FIG. 2, 101 is a fan for the scanner, 102 is a polygonal mirror used with a laser printer, and 103 designates an F lens used to collimate light from a laser (not illustrated). Reference numeral 104 designates a sensor for detecting light from the scanner. 105 is a lens for focusing light from the scanner onto the sensor 104, and 106 is a quenching lamp used to erase images on the photoconductive drum 132. There is a charging corona unit 107 and a developing roller 108. Reference numeral 109 designates a lamp used to illustrate a document to be scanned and 110, 111 and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the digital image forming apparatus, and 115 is a first paper feed roller used for feeding paper from the first paper feed cassette 117, and 116 is a manual feed table. Similarly, 118 is a second paper feed roller for the second cassette 119. Reference numeral 120 designates a relay roller, 121 is a registration roller. 122 is an image density sensor and 123 is a transfer/separation corona unit. Reference numeral 124 is a cleaning unit, 125 is a vacuum fan, 126 illustrates a transport belt, 127 is a pressure roller, and 128 is an exit roller. Reference numeral 129 is a hot roller used to fix toner onto the paper, 130 is an exhaust fan and 131 is the main motor used to drive the digital image forming apparatus.

Figure 3:
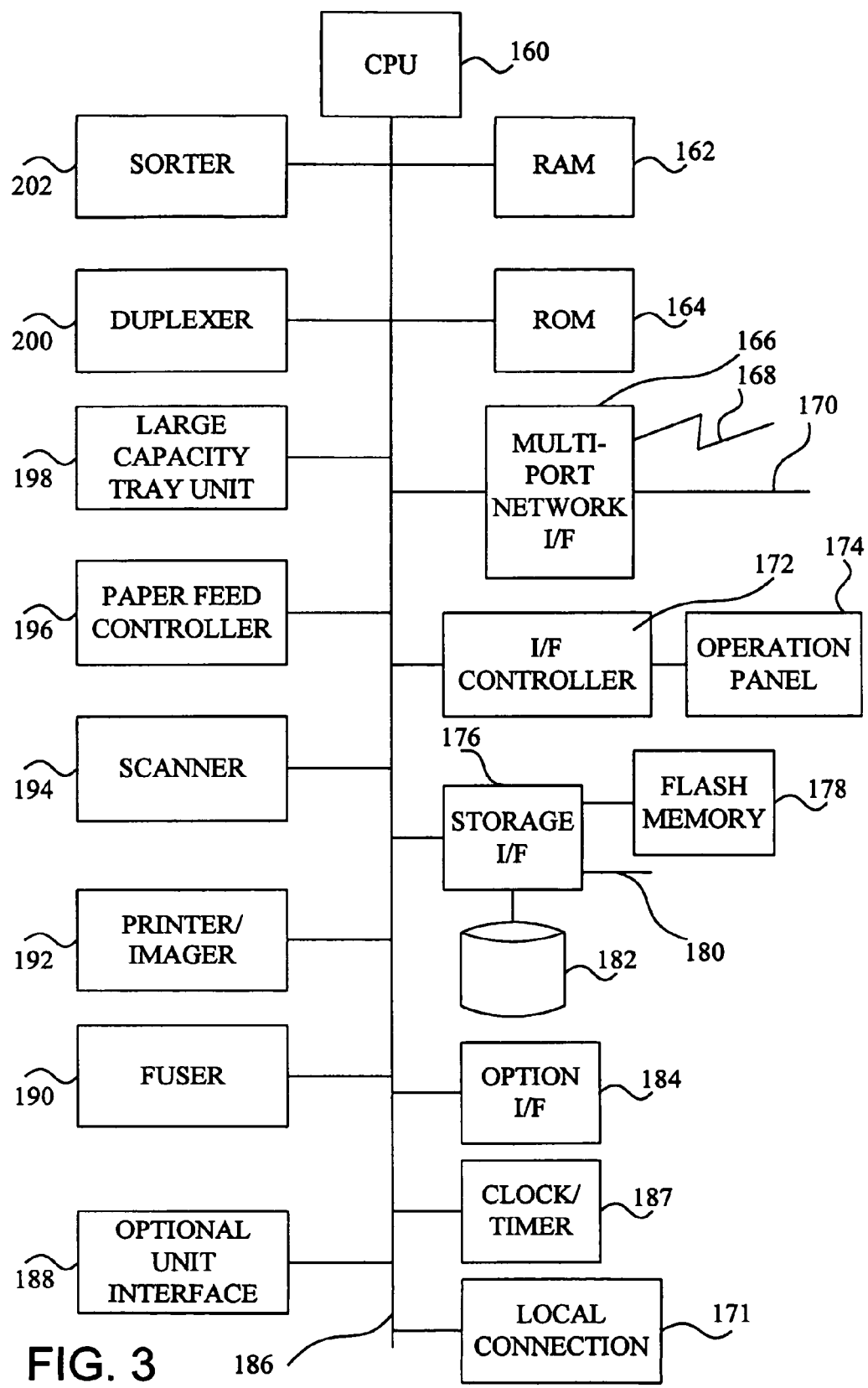
FIG. 3 illustrates the electronic components of the digital image forming apparatus illustrated in FIG. 2.

FIG. 3 illustrates a block diagram of the electronic components illustrated in FIG. 2. The CPU 160 is a microprocessor and acts as the system controller. Random access memory (RAM) 162 stores dynamically changing information including operating parameters of the digital image forming apparatus. A non-volatile memory (e.g., a read only memory (ROM) 164 or a Flash Memory) stores (1) the program code used to run the digital image forming apparatus and (2) static-state data, describing the copier (e.g., the model number, serial number of the copier, and default parameters.

There is a multi-port network interface 166 which allows the digital image forming apparatus to communicate with external devices through at least one network. Reference number 168 represents a telephone, ISDN, or cable line, and numeral 170 represents another type of network. Additional details of the multi-port network interface are described with respect to FIG. 4. An interface controller 172 is used to connect an operation panel 174 to a system bus 186. The operation panel 174 includes standard input and output devices found on a digital image forming apparatus including a copy button, keys to control the operation of the copier such as number of copies, reducement/enlargement, darkness/lightness, etc. Additionally, a liquid crystal display may be included within the operation panel 174 to display parameters and messages of the digital image forming apparatus to a user.

The local connection interface 171 is a connection through local ports such as RS232, the parallel printer port, USB, and IEEE 1394. FireWire (IEEE 1394) is described in Wickelgren, I., "The Facts About "FireWire", IEEE Spectrum, April 1997, Vol. 34, Number 4, pp. 19-25, the contents of which are incorporated herein by reference. Preferably, communication utilizes a "reliable" protocol with error detection and retransmission.

A storage interface 176 connects storage devices to the system bus 186. The storage devices include a flash memory 178 which can be substituted by a conventional EEPROM and a disk 182. The disk 182 includes a hard disk, optical disk, and/or a floppy disk drive. There is a connection 180 connected to the storage interface 176 which allows for additional memory devices to be connected to the digital image forming apparatus. The flash memory 178 is used to store semi-static state data which describes parameters of the digital image forming apparatus which infrequently change over the life of the copier. Such parameters include the options and configuration of the digital image forming apparatus. An option interface 184 allows additional hardware such as an external interface to be connected to the digital image forming apparatus. A clock/timer 187 is utilized to keep track of both the time and date and also to measure elapsed time.

On the left side of FIG. 3, the various sections making up the digital image forming device are illustrated. Reference numeral 202 designates a sorter and contains sensors and actuators used to sort the output of the digital image forming device. There is a duplexer 200 which allows a duplex operation to be performed by the digital image forming device and includes conventional sensors and actuators. The digital image forming device includes a large capacity tray unit 198 which allows paper trays holding a large number of sheets to be used with the digital image forming device. The large capacity tray unit 198 includes conventional sensors and actuators.

A paper feed controller 196 is used to control the operation of feeding paper into and through the digital image forming device. A scanner 194 is used to scan images into the digital image forming device and includes conventional scanning elements such as a light, mirror, etc. Additionally, scanner sensors are used such as a home position sensor to determine that the scanner is in the home position, and a lamp thermistor is used to ensure proper operation of the scanning lamp. There is a printer/imager 192 which prints the output of the digital image forming device and includes a conventional laser printing mechanism, a toner sensor, and an image density sensor. The fuser 190 is used to fuse the toner onto the page using a high temperature roller and includes an exit sensor, a thermistor to assure that the fuser 190 is not overheating, and an oil sensor. Additionally, there is an optional unit interface 188 used to connect to optional elements of the digital image forming device such as an automatic document feeder, a different type of sorter/collator, or other elements which can be added to the digital image forming device.

Figure 4:
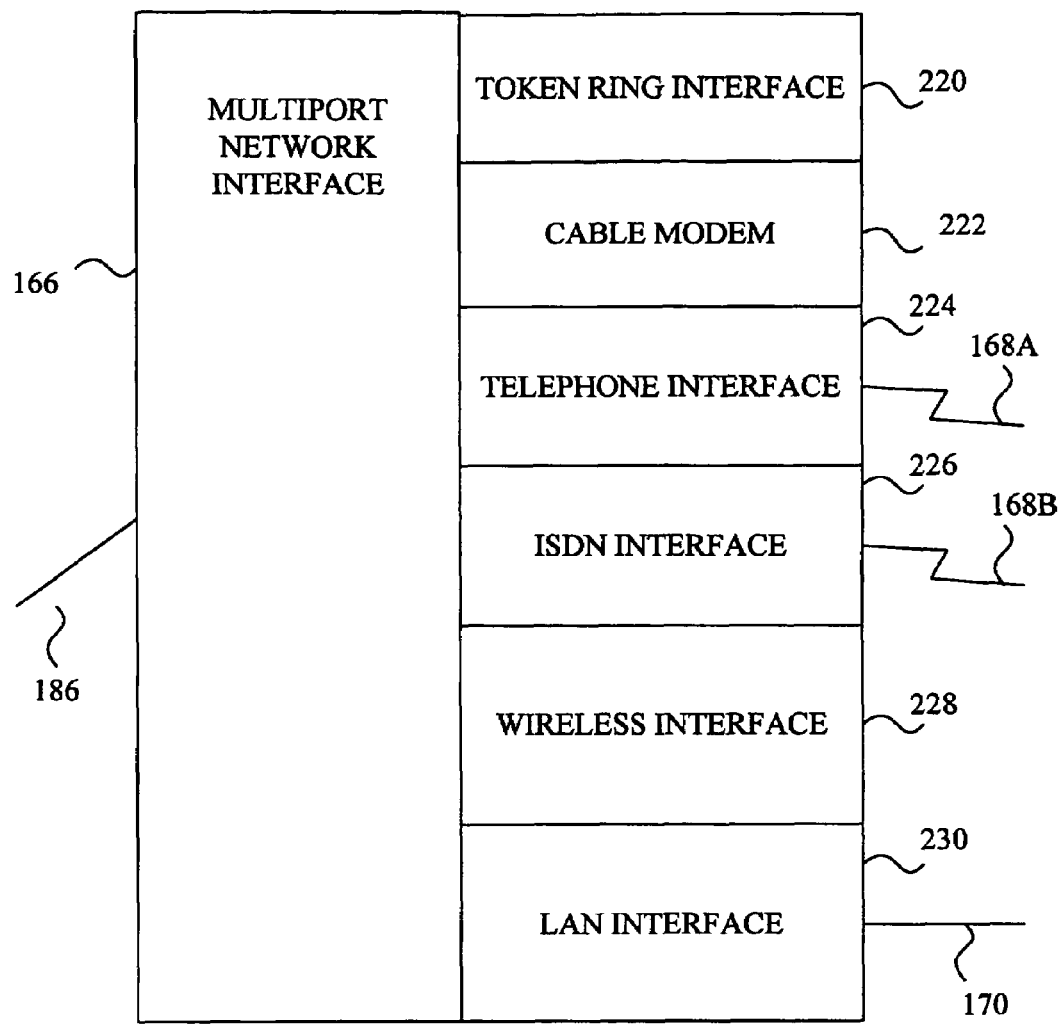
FIG. 4 illustrates details of the multi-port communication interface illustrated in FIG. 3.

FIG. 4 illustrates details of the multi-port network interface 166. The digital image forming device may communicate to external devices through a Token Ring interface 220, a cable modem unit 222 which has a high speed connection over cable, a conventional telephone interface 224 which connects to a telephone line 168A, an ISDN interface 226 which connects to an ISDN line 168B, wireless interface 228, and a LAN interface 230 (e.g., Ethernet) which connects to a LAN 170. Other interfaces (not shown) include, but are not limited to, Digital Subscriber Line (DSL) (original DSL, concentric DSL, and asymmetric DSL). A single device which connects to both a Local Area Network and a telephone line is commercially available from Megahertz and is known as the Ethernet-Modem.

The CPU or other microprocessor or circuitry executes a monitoring process to monitor the state of each of the sensors of the digital image forming device, and a sequencing process is used to execute the instructions of the code used to control and operate the digital image forming device. Additionally, there is (1) a central system control process executed to control the overall operation of the digital image forming device and (2) a communication process used to assure reliable communication to external devices connected to the digital image forming device. The system control process monitors and controls data storage in a static state memory (e.g., the ROM 164 of FIG. 3), a semi-static memory (e.g., the flash memory 178 or disk 182), or the dynamic state memory (e.g., a volatile or non-volatile memory (e.g., the RAM 162 or the flash memory 178 or disk 182)). Additionally, the static state memory may be a device other than the ROM 164 such as a non-volatile memory including either of the flash memory 178 or disk 182.

The above details have been described with respect to a digital image forming device but the present invention is equally applicable to other business office machines or devices such as an analog copier, a facsimile machine, a scanner, a printer, a facsimile server, or other business office machines and business office appliance, or appliances (e.g., a microwave oven, VCR, digital camera, cellular phone, palm top computer). Additionally, the present invention includes other types of devices which operate using store-and-forward or direct connection-based communication. Such devices include metering systems (including gas, water, or electricity metering systems), vending machines, or any other mechanical device (e.g., automobiles) that need to be monitored during operation or remote diagnosis. In addition to monitoring special purpose machines and computers, the invention can be used to monitor, control, and diagnose a general purpose computer which would be the monitored and/or controlled device.

Figure 5:
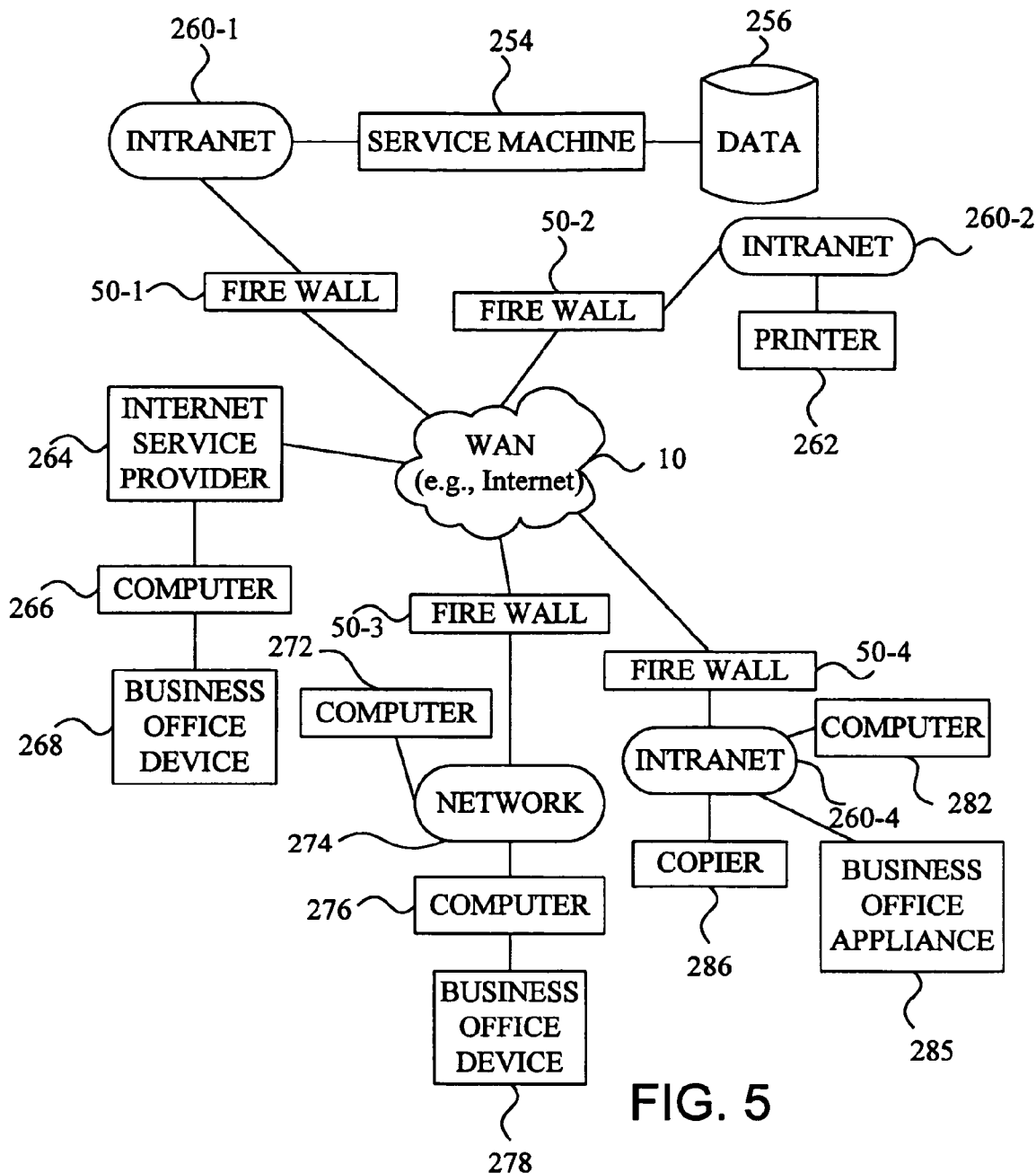
FIG. 5 illustrates an alternative system configuration in which business office devices are either connected directly to the network or connected to a computer which is connected to the network.

FIG. 5 illustrates an alternative system diagram of the invention in which different devices and subsystems are connected to the WAN 10. However, there is no requirement to have each of these devices or subsystems as part of the invention. Each component or subsystem illustrated in FIG. 5 is individually part of the invention. Further, the elements illustrated in FIG. 1 may be connected to the WAN 10 which is illustrated in FIG. 5. In FIG. 5, there is illustrated a firewall 50-1 connected to an intranet 260-1. The service machine 254 connected to the intranet 260-1 includes therein or has connected thereto data 256 which may be stored in a database format. The data 256 includes history, performance, malfunction, and any other information including statistical information of the operation or failure or set-up and components or optional equipment of devices which are being monitored. The service machine 254 may be implemented as the device or computer which requests the monitored devices to transmit data or which requests that remote control and/or diagnostic tests be performed on the monitored devices. The service machine 254 may be implemented as any type of device and is preferably implemented using a computerized device such as a general purpose computer.

Another sub-system of FIG. 5 includes a firewall 50-2, an intranet 260-2, and a printer 262 connected thereto. In this sub-system, the functions of sending and receiving electronic messages by the printer 262 (and similarly by a copier 286) are performed by (1) circuitry, (2) a microprocessor, or (3) any other type of hardware contained within or mounted to the printer 262 (i.e., without using a separate general purpose computer).

An alternate type of sub-system includes the use of an Internet service provider 264 which may be any type of Internet service provider (ISP), including known commercial companies such as America Online, Earthlink, and Niftyserve. In this sub-system, a computer 266 is connected to the ISP 264 through a digital or analog modem (e.g., a telephone line modem, a cable modem, modems which use any type of wires such as modems used over an ISDN (Integrated Services Digital Network) line, ASDL (Asymmetric Digital Subscriber Line), modems which use frame relay communication, wireless modems such as a radio frequency modem, a fiber optic modem, or a device which uses infrared light waves). Further, a business office device 268 is connected to the computer 266. As an alternative to the business office device 268 (and any other device illustrated in FIG. 5), a different type of machine may be monitored or controlled such as a digital copier, any type of appliance, security system, or utility meter such as an electrical, water, or gas utility meter, or any other device discussed herein.

Also illustrated in FIG. 5 is a firewall 50-3 connected to a network 274. The network 274 may be implemented as any type of computer network, (e.g., an Ethernet or token-ring network). Networking software which may be used to control the network includes any desired networking software including software commercially available from Novell or Microsoft. The network 274 may be implemented as an Intranet, if desired. A computer 272 connected to the network 274 may be used to obtain information from a business office device 278 and generate reports such as reports showing problems which occurred in various machines connected to the network and a monthly usage report of the devices connected to the network 274. In this embodiment, a computer 276 is connected between the business office device 278 and the network 274. This computer receives communications from the network and forwards the appropriate commands or data, or any other information, to the business office device 278. Communication between the business office device 278 and the computer 276 may be accomplished using wire-based or wireless methods including, but not limited to radio frequency connections, electrical connections and light connections (e.g., an infrared connection, or a fiber optics connection). Similarly, each of the various networks and intranets illustrated in FIG. 5 may be established using any desired manner including through the establishment of wireless networks such as radio frequency networks. The wireless communication described herein may be established using spread spectrum techniques including techniques which use a spreading code and frequency hopping techniques such as the frequency hopping wireless technique which is disclosed in the Bluetooth Specification (available at the world wide web site www.bluetooth.com), which is incorporated herein by reference.

Another sub-system illustrated in FIG. 5 includes a firewall 50-4, an intranet 260-4, a computer 282 connected thereto, a business office appliance 285 and a copier 286. The computer 282 may be used to generate reports and request diagnostic or control procedures. These diagnostic and control procedures may be performed with respect to the business office appliance 285 and the copier 286 or any of the other devices illustrated in or used with FIG. 5. While FIG. 5 illustrates a plurality of firewalls, the firewalls are preferable but optional equipment and therefore the invention may be operated without the use of firewalls, if desired.

Figure 6A:
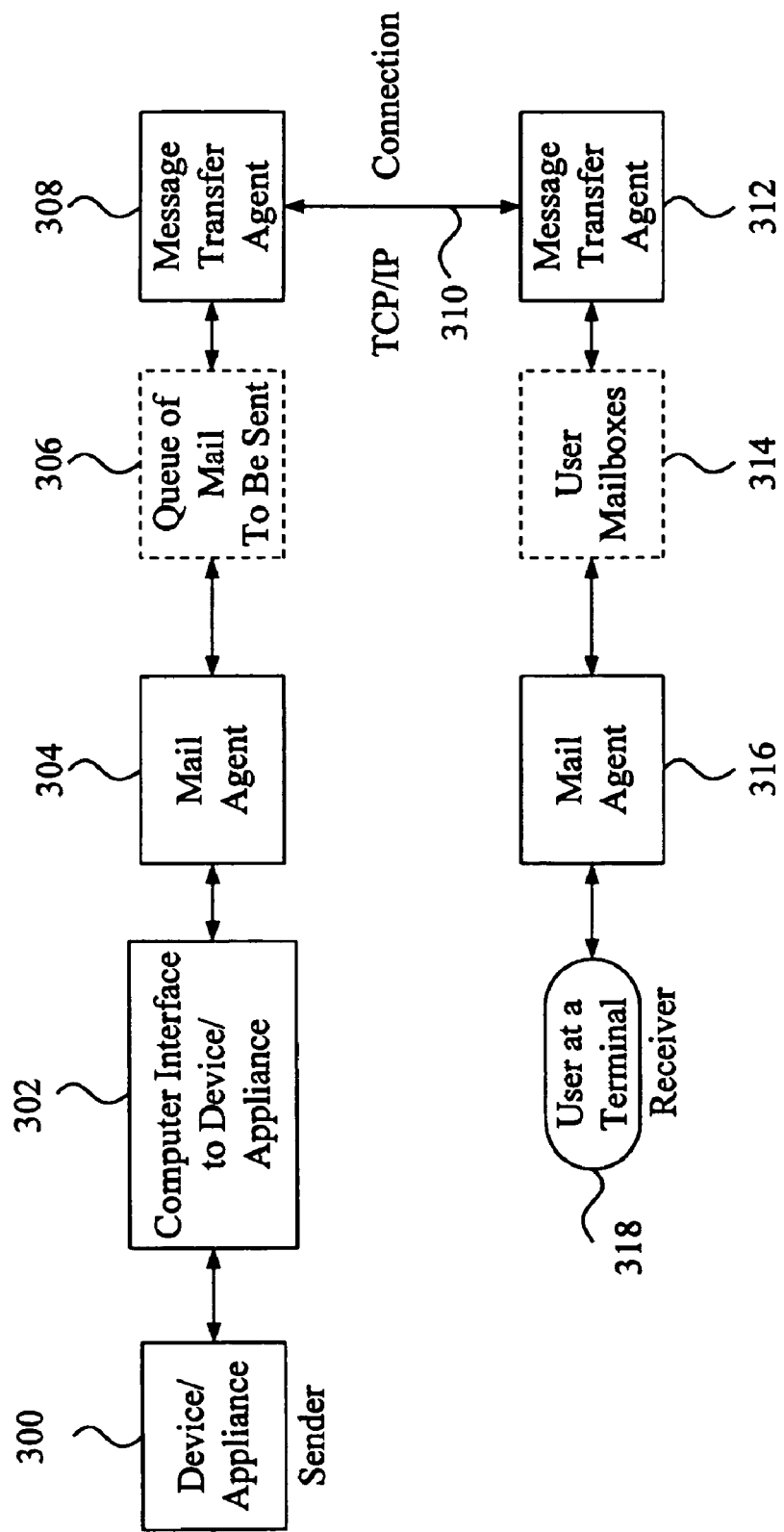
FIG. 6A illustrates in block diagram format the flow of information to and from an application unit using electronic mail.

FIG. 6A illustrates a Device/Appliance 300 connected to a typical e-mail exchange system which includes components 302, 304, 306, 308, 310, 312, 314, 316, and 318 which may be implemented in a conventional manner and are taken from FIG. 28.1 of Stevens, above. A computer 302 interfaces with any of the application units 300 described herein. While FIG. 6A illustrates that the Device/Appliance 300 is the sender, the sending and receiving functions may be reversed in FIG. 6A. Furthermore, if desired, the user may not be needed to interface with the Device/Appliance 300 at all. The computer interface 302 then interacts with a mail agent 304. Popular mail agents for Unix include MH, Berkeley Mail, Elm, and Mush. Mail agents for the Windows family of operating systems include Microsoft Outlook and Microsoft Outlook Express. At the request of the computer interface 302, the mail agent 304 creates e-mail messages to be sent and, if desired, places these messages to be sent in a queue 306. The mail to be sent is forwarded to a Message Transfer Agent (MTA) 308. A common MTA for Unix systems is Sendmail. Typically, the message transfer agents 308 and 312 exchange communications using a TCP/IP connection. Notably, the communication between the message transfer agents 308 and 312 may occur over any size network (e.g., WAN or LAN). Further, the message transfer agents 308 and 312 may utilize any communication protocol. In the present invention, steps 302 and 304 reside in the library to monitor the application unit's usage.

From the message transfer agents 312, e-mail messages are stored in user mailboxes 314 which are transferred to the mail agent 316 and ultimately transmitted to the user at a terminal 318 which functions as a receiving terminal.

This "store-and-forward" process avoids the sending mail agent 304 from having to wait until establishment of the direct connection with the mail recipient. Because of network delays, the communication could take a substantial amount of time during which the application would be unresponsive. Such an unresponsiveness is generally unacceptable to users of the application unit. By using e-mail as the store-and-forward process, retransmission attempts after failures occur automatically for a fixed period of time (e.g., three days). In an alternate embodiment, the application can avoid waiting by passing communicating requests to one or more separate threads. Those threads can then control communication with the receiving terminal 318 while the application begins responding to the user interface again. In yet another embodiment in which a user wishes to have communication completed before continuing, direct communication with the receiving terminal is used. Such direct communication can utilize any protocol not blocked by a firewall between the sending and receiving terminals. Examples of such protocols include FTP and HTTP.

Public WANs, such as the Internet, are not considered to be secure. Therefore, messages transmitted over the public WANs (and multi-company private WANs) should be encrypted to keep the messages confidential. Encryption mechanisms are known and commercially available which may be used with the present invention. For example, a C library function, crypto, is available from Sun Microsystems for use with the Unix operating system. Other encryption and decryption software packages are known and commercially available and may also be used with this invention. One such package is PGP Virtual Private Network (VPN) available from Network Associates. Other VPN software is available from Microsoft Corporation.

Figure 6B:
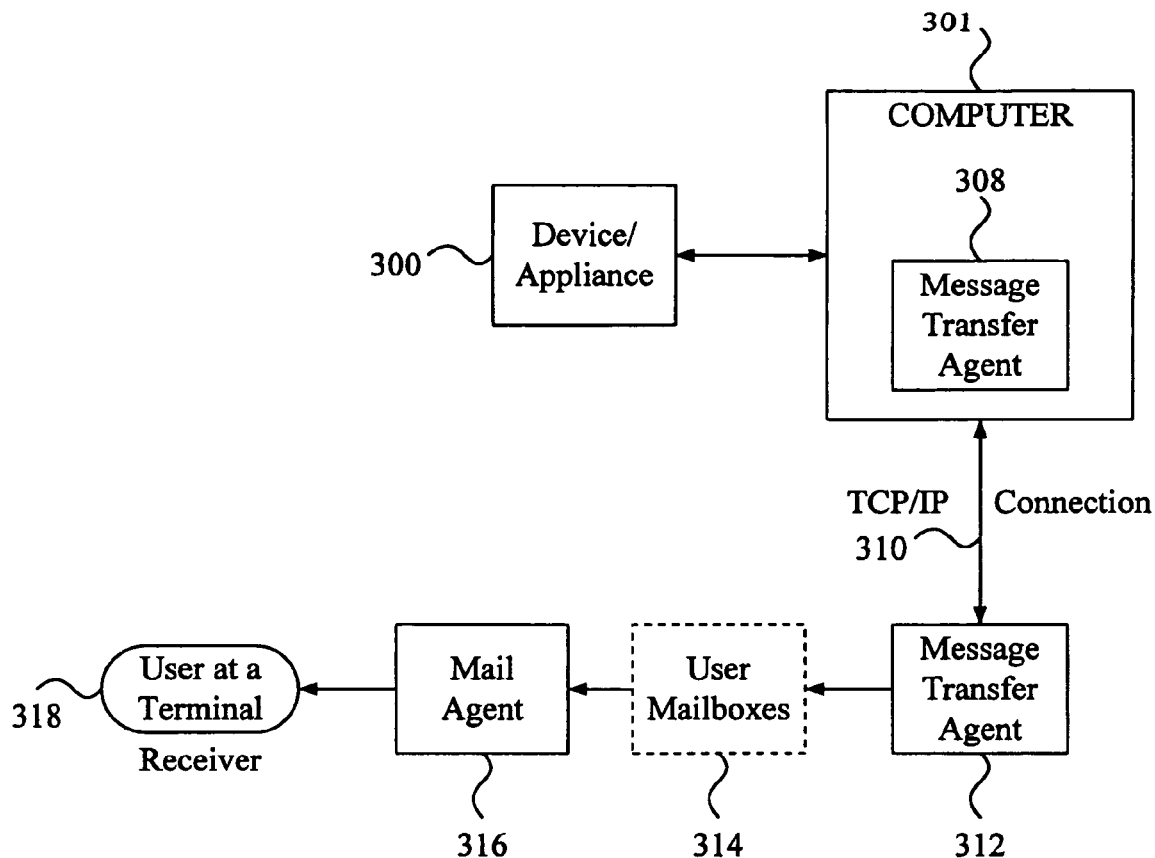
FIG. 6B illustrates an alternative way of communicating using electronic mail in which the computer which is connected to the application unit also serves as a message transfer agent.

As an alternative to the general structure of FIG. 6A, a single computer may be used which functions as the computer interface 302, the mail agent 304, the mail queue 306 and the message transfer agent 308. As illustrated in FIG. 6B, the Device/Appliance 300 is connected to a computer 301 which includes the message transfer agent 308.

Figure 6C:
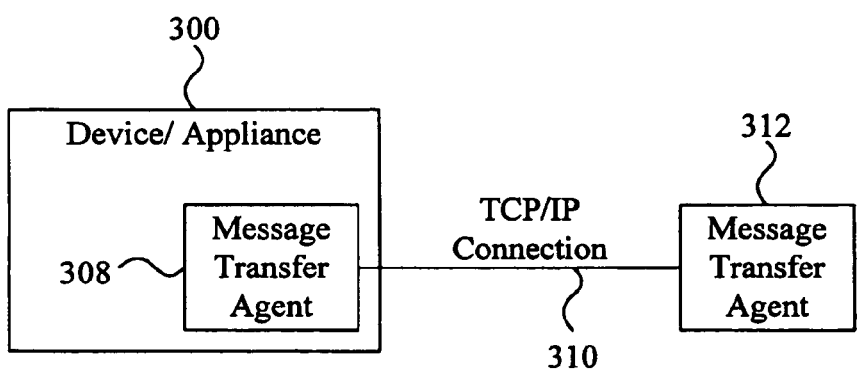
FIG. 6C illustrates an alternative way of communicating using electronic mail in which an application unit includes a message transfer agent for exchanging electronic mail.

A further alternative structure is shown in FIG. 6C in which the message transfer agent 308 is formed as part of the Device/Appliance 300. Further, the message transfer agent 308 is connected to the message transfer agent 312 by a TCP/IP connection 310. In the embodiment of FIG. 6C, the Device/Appliance 300 is directly connected to the TCP/IP connection 310 and has an e-mail capability. One use of the embodiment of FIG. 6C includes using a facsimile machine with an e-mail capability (defined in RFC 2305 (a simple mode of facsimile using Internet mail)) as the Device/Appliance 300.

Figure 6D:
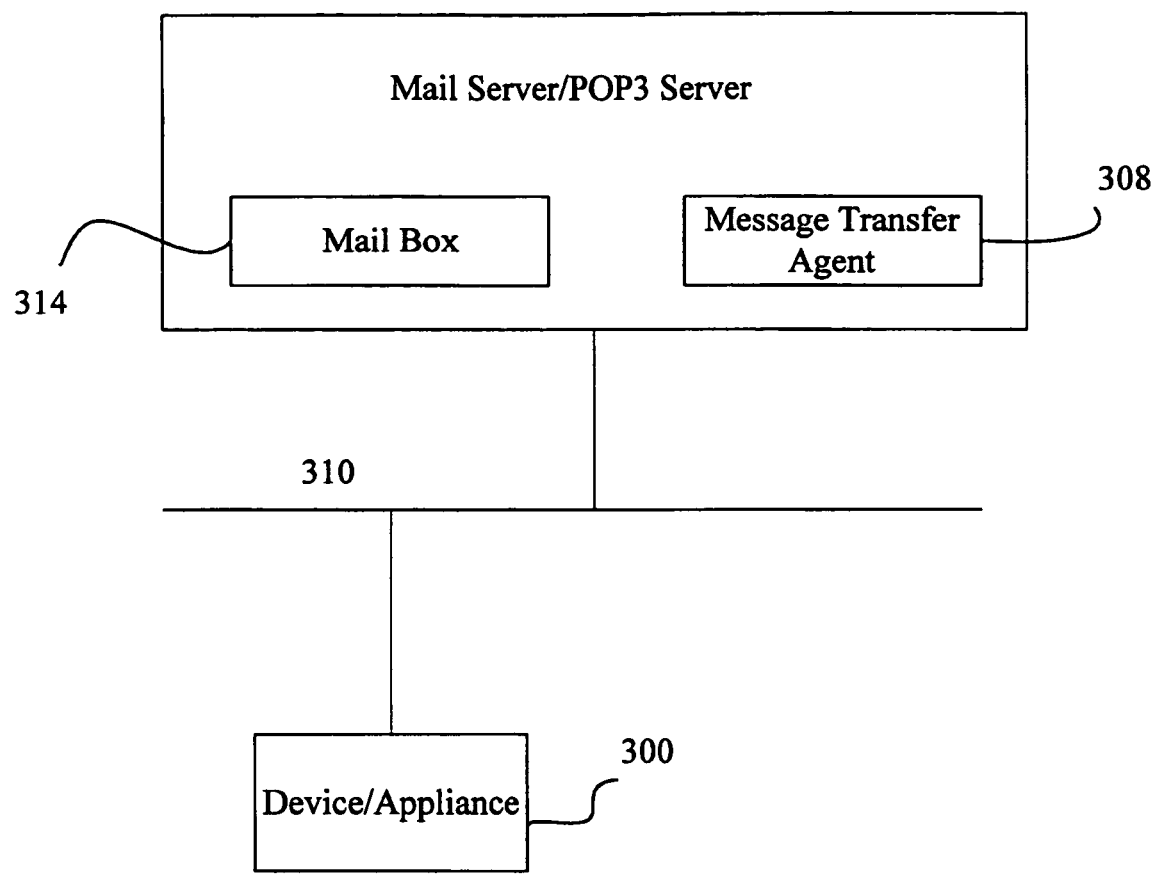
FIG. 6D illustrates an alternative way of communicating using electronic mail in which a mail server acts as POP 3 server to receive mail for an Appliance/Device and as an SMTP server to send mail for Appliance/Device.

FIG. 6D shows a system where an appliance or a device does not itself have the capability to receive directly e-mail, but uses the POP3 protocol to retrieve the received mail from mail server.

Figure 7:
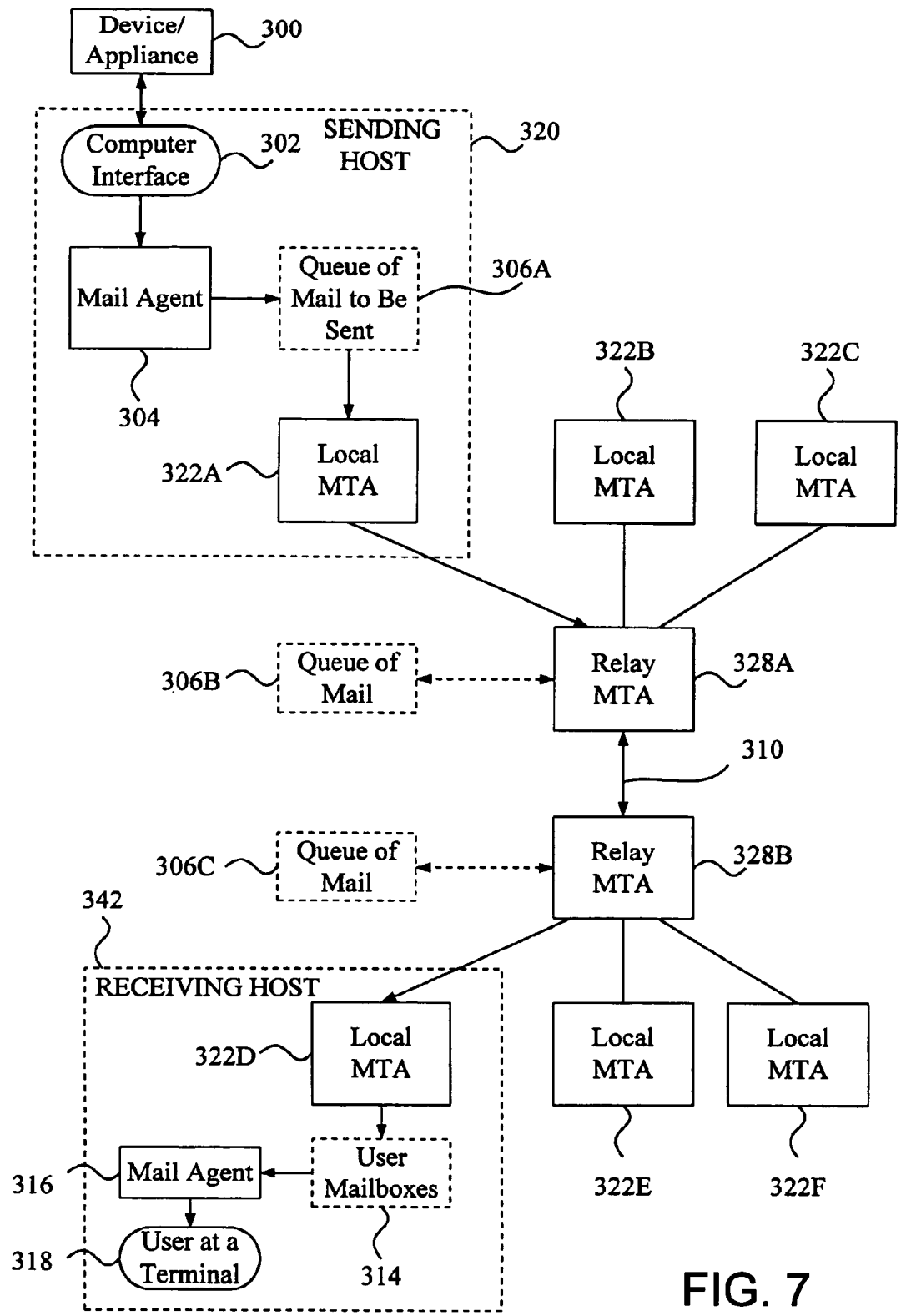
FIG. 7 illustrates an alternative manner of sending messages across the Internet.

FIG. 7 illustrates an alternative implementation of transferring mail and is based on FIG. 28.3 of Stevens. FIG. 7 illustrates an electronic mail system having a relay system at each end. The arrangement of FIG. 7 allows one system at an organization to act as a mail hub. In FIG. 7, there are four MTAs connected between the two mail agents 304 and 316. These MTAs include local MTA 322A, relay MTA 328A, relay MTA 328B, and local MTA 322D. The most common protocol used for mail messages is SMTP (Simple Mail Transfer Protocol) which may be used with this invention, although any desired mail protocol may be utilized. In FIG. 7, 320 designates a sending host which includes the computer interface 302, the mail agent 304, and the local MTA 322A. The Device/Appliance 300 is connected to, or alternatively included within, the sending host 320. As another case, the Device/Appliance 300 and host 320 can be in one machine where the host capability is built into the Device/Appliance 300. Other local MTAs 322B, 322C, 322E and 322F may also be included. Mail to be transmitted and received may be queued in a queue of mail 306B of the relay MTA 328A. The messages are transferred across the TCP/IP connection 310 (e.g., an Internet connection or a connection across any other type of network).

The transmitted messages are received by the relay MTA 328B and if desired, stored in a queue of mail 306C. The mail is then forwarded to the local MTA 322D of a receiving host 342. The mail may be placed in one or more of the user mailboxes 314 and subsequently forwarded to the mail agent 316 and finally forwarded to the user at a terminal 318. If desired, the mail may be directly forwarded to the terminal without user interaction.

Figure 8:
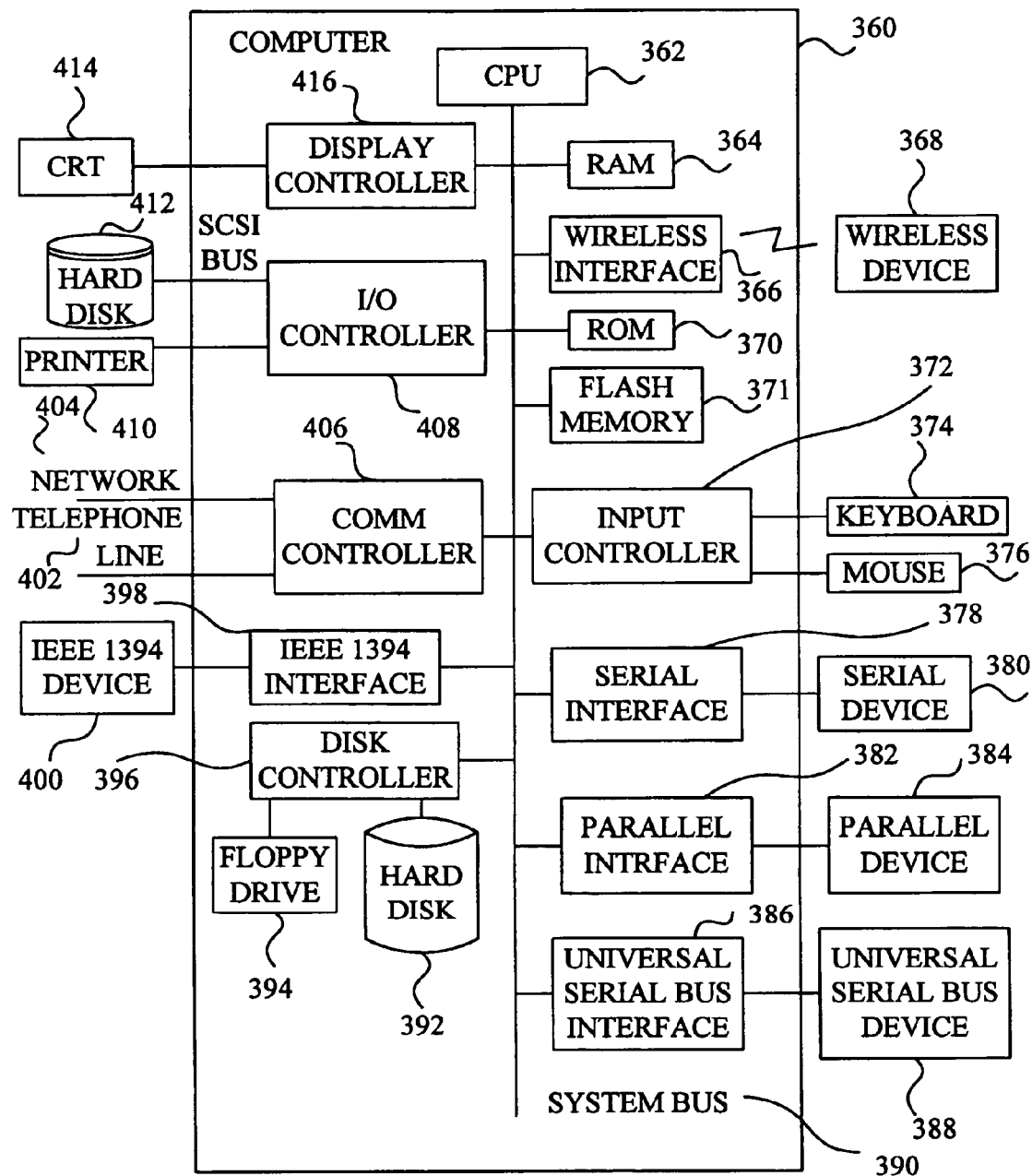
FIG. 8 illustrates an exemplary computer which may be connected to the device and used to communicate electronic mail messages.

The various computers utilized by the present invention, including the computers 266 and 276 of FIG. 5, may be implemented as illustrated in FIG. 8. Further, any other computer utilized by this invention may be implemented in a similar manner to the computer illustrated in FIG. 8, if desired, including the service machine 254, computer 272, and computer 282 of FIG. 5. However, not every element illustrated in FIG. 8 is required in each of those computers. In FIG. 8, the computer 360 includes a CPU 362 which may be implemented as any type of processor including commercially available microprocessors from companies such as Intel, AMD, Motorola, Hitachi and NEC. There is a working memory such as a RAM 364, and a wireless interface 366 which communicates with a wireless device 368. The communication between the interface 366 and device 368 may use any wireless medium (e.g., radio waves or light waves). The radio waves maybe implemented using a spread spectrum technique such as Code Division Multiple Access (CDA) communication or using a frequency hopping technique such as that disclosed in the Bluetooth specification.

There is a ROM 370 and a flash memory 371, although any other type of non-volatile memory (e.g., EPROM, or an EEPROM) may be utilized in addition to or in place of the flash memory 371. An input controller 372 has connected thereto a keyboard 374 and a mouse 376. There is a serial interface 378 connected to a serial device 380. Additionally, a parallel interface 382 is connected to a parallel device 384, a universal serial bus interface 386 is connected to a universal serial bus device 388, and also there is an IEEE 1394 device 400, commonly referred to as a fire wire device, connected to an IEEE 1394 interface 398. The various elements of the computer 360 are connected by a system bus 390. A disk controller 396 is connected to a floppy disk drive 394 and a hard disk drive 392. A communication controller 400 allows the computer 360 to communicate with other computers (e.g., by sending e-mail messages) over a telephone line 402 or a network 404. An I/O (Input/Output) controller 408 is connected to a printer 410 and a hard disk 412, for example using a SCSI (Small Computer System Interface) bus. There is also a display controller 416 connected to a CRT (Cathode Ray Tube) 414, although any other type of display may be used including a liquid crystal display, a light emitting diode display, a plasma display, etc.

One feature in the present invention is to monitor how a user uses a target application of an application unit. The term application unit in this instance refers to a system which a user interacts with and controls. A "target application" refers to a user controlled system that controls the application unit. For example, an application unit may typically be a computer and a target application may then be a software program, e.g. a word processor, running on the computer which a user operates, for example by moving a pointer on a computer screen and "clicking" on certain command icons to cause the software program to perform certain functions. In this sense, an application unit in the present invention can refer to any of workstations 17, 18, 20, 22, 56, 62, 68, 74, 42 shown in FIG. 1 running a software program, the computer 301 shown in FIG. 6B running a software program, etc. An application unit can also refer to an image forming device such as any of the digital image forming apparatus 24, facsimile machine 28, and printer 32 in FIGS. 1 and 2. In this instance, each of these device application units includes a user interface, such as operation panel 174 (see FIG. 3), which a user interacts with and utilizes to control the device application unit. The present invention can monitor a user selecting controls on such an operation panel. As a further example, the application unit could also be an appliance, such as a microwave oven, with an operation panel. An application unit can also refer to any other device, including software, with which a user interacts, and in this case the target application may refer to only one feature of the software which the user interacts with.

One feature of the present invention is to monitor the user's usage of such a target application of an application unit, and to communicate data of the monitored usage. This data will typically be transmitted by e-mail by the computer interface 302 of FIG. 6A, or the computer 301 of FIG. 6B or the Device/Appliance 300 of FIG. 6C. This data of a user's usage of a target application of an application unit can then be utilized in many ways, for example in improving software development, in monitoring usage of a device (e.g., an image forming device), discovering user difficulties with appliances and software, and finding most frequently used features of application units.

Figure 9:
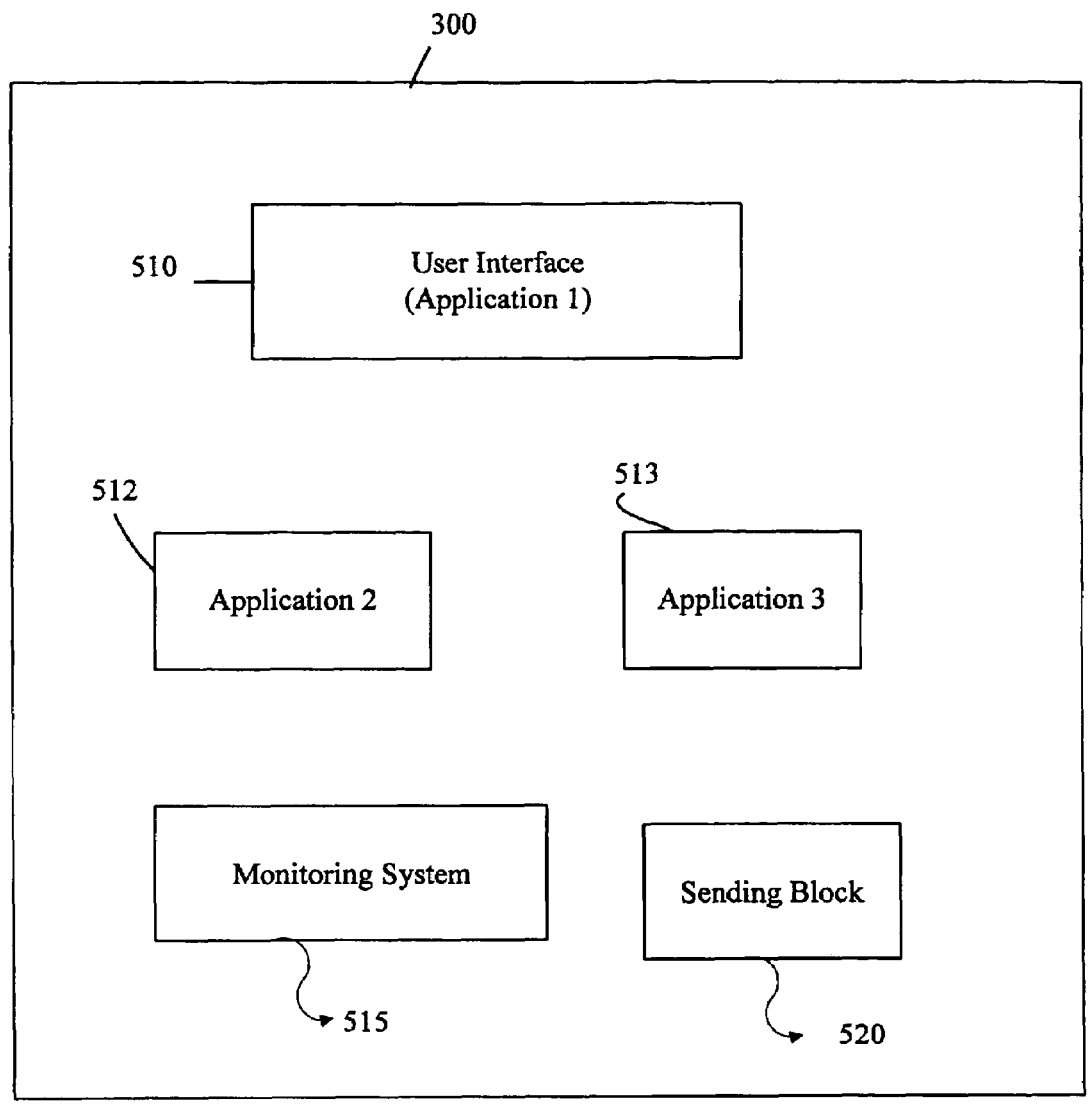
FIG. 9 is a block diagram illustrating connections between a monitoring and logging subsystem, a communications subsystem and a target application of an application unit in the present invention.

FIG. 9 shows various elements of the present invention. More particularly, FIG. 9 shows an Device/Appliance 300 including target applications 510, 512 and 513. The user interface 510 is an interface for a user to control the appliance or device. As discussed above, in one common instance, the target appliance 300 may be a software program running on one of the workstations 17, 18, 20, 22 (FIG. 1) of the present specification. In this instance, the user interface 510 may be a display on a monitor of one of these workstations. In such a case, the monitoring system 515 may monitor the user behavior of clicking the selected menu. Another application may be that the appliance 300 is a copier where "application 2" (512) is a sorting of the multiple copies. Both User interface 510 and "Application 2" (512) would send event messages to Monitoring System 515 to be logged. The Monitoring System 515 is implemented either only in hardware or using a combination of hardware and software where the combination includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware and for enabling the system to interact with a human user. Such software (in the form of computer code devices) may include, but is not limited to, device drivers, operating systems and user applications, such as development tools. Such computer readable media further includes the computer program product of the present invention for monitoring and controlling an application unit. The computer code devices of the present invention can be any interpreted or executable code mechanism, including but not limited to scripts, interpreters, dynamic link libraries, classes (e.g., Java or C++), packages (e.g., Java or C++) and complete executable programs.

Another illustrative embodiment of FIG. 9 is an office device such as a digital copier where Application 1 (510) is the aforementioned user interface. Application 2 (512) is the software error tracking system to monitor the internal error conditions of the software system. Application 3 (513) is the mechanical error tracking system to monitor the mechanical error condition such as jam and toner out. All of the applications are using the Monitoring System (515) and Sending Block (520). As a further example, and as noted above, the Device/Appliance 300 may be an image forming device such as the digital image forming apparatus 26, facsimile machine 28, or printer 32 also shown in FIG. 1. In this instance, the user interface 510 may take the form of an operation panel (e.g., operation panel 174 in FIG. 3) with a plurality of keys and/or a touch screen which a user operates to control the image forming device. When the Device/Appliance 300 in FIG. 9 is an image forming device with a user interface 510, the present invention can monitor the commands that a user selects.

At a designated time, the logged data of the events is then sent to the sending block 520, which then communicates such monitored event data to a designated party. The monitoring and logging DLL 515 can be implemented in the device including the Device/Appliance 300 or in another system control element. The protocol processing system can also be implemented in the device including the application unit in FIG. 6C, or can also be implemented in the computer 301 in FIG. 6B to which the application unit is attached. The present invention can also take the form of computer control codes recorded on a computer readable medium.

Figure 11:
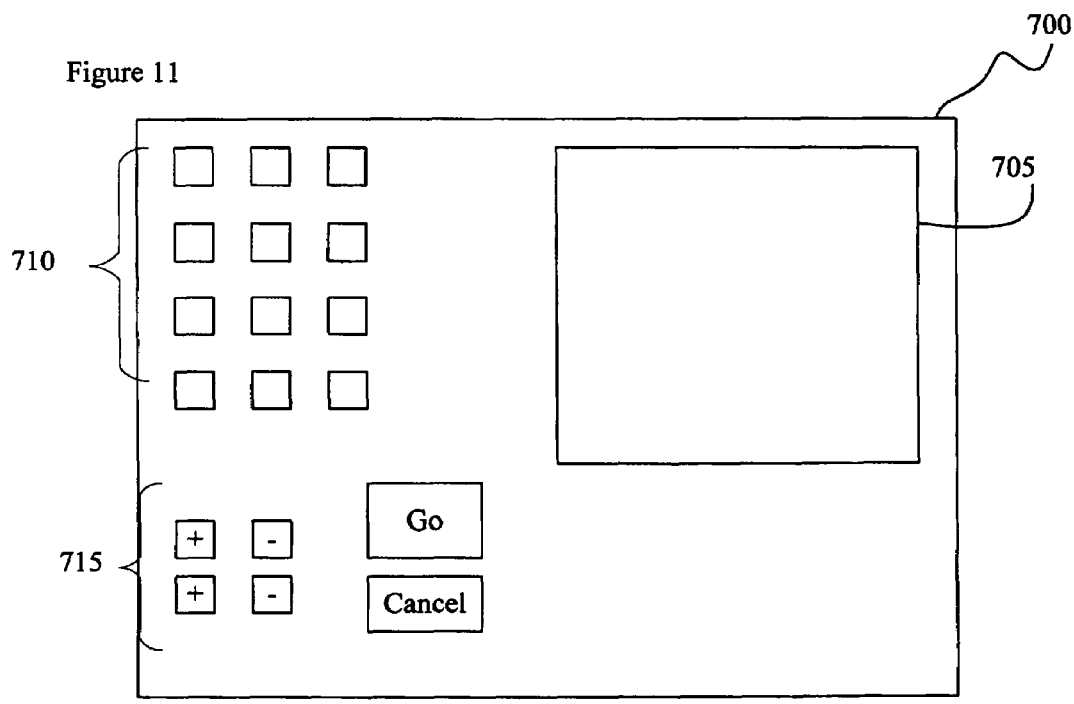
FIG. 11 shows a second example of an application unit to which the present invention can be applied.

One illustrative embodiment of such a user interface 510 used with a digital image forming apparatus 26, facsimile machine 28, or printer 32 is shown in FIG. 11. In that embodiment, the present invention monitors each time a user presses one of the control buttons on the operation panel and logs the usage data of such a user usage for subsequent communication.

As shown in FIG. 11, such an operation panel 700 may include a touch screen 705 on which various commands may appear which an operator can select by touching different portions of the touch screen 705. The operation panel 700 may also include a 10-key pad 710 and various other control buttons 715. In the case of an image forming device, the control buttons 715 may be commands for selecting a paper size, changing a magnification, changing a darkness of a desired image, etc.

When the Device/Appliance 300 in FIG. 9 is an image forming device and the user interface 510 corresponds to the operation panel 700 as shown in FIG. 11, the present invention can monitor the commands (shown in FIG. 11) that a user selects. The operation panel 700 shown in FIG. 11 may, with modifications, also be an operation panel for a user-controlled appliance such as a microwave oven, VCR, digital camera, cellular phone, palm top computer, etc.

Figure 10:
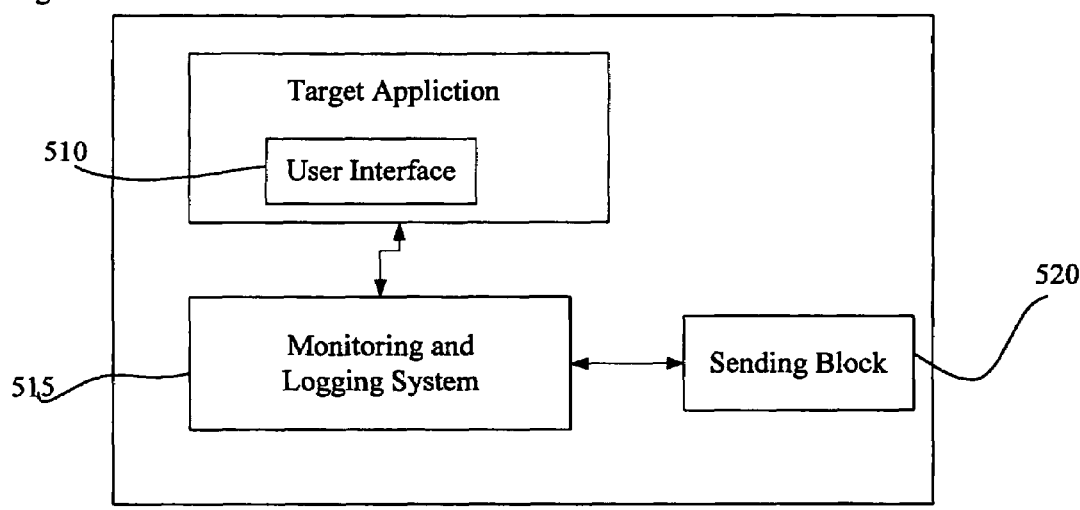
FIG. 10 shows a first example of an application unit to which the present invention can be applied.

FIGS. 10 and 11 show examples of the Device/Appliance 300 and user interface 510 of FIG. 9 to which the present invention can be applied. As would be readily apparent to those of ordinary skill in the art, the present invention is directed to various types of application units including various types of user interfaces. The present invention is applicable to any device to be monitored which includes a user interface.

Figure 12A:
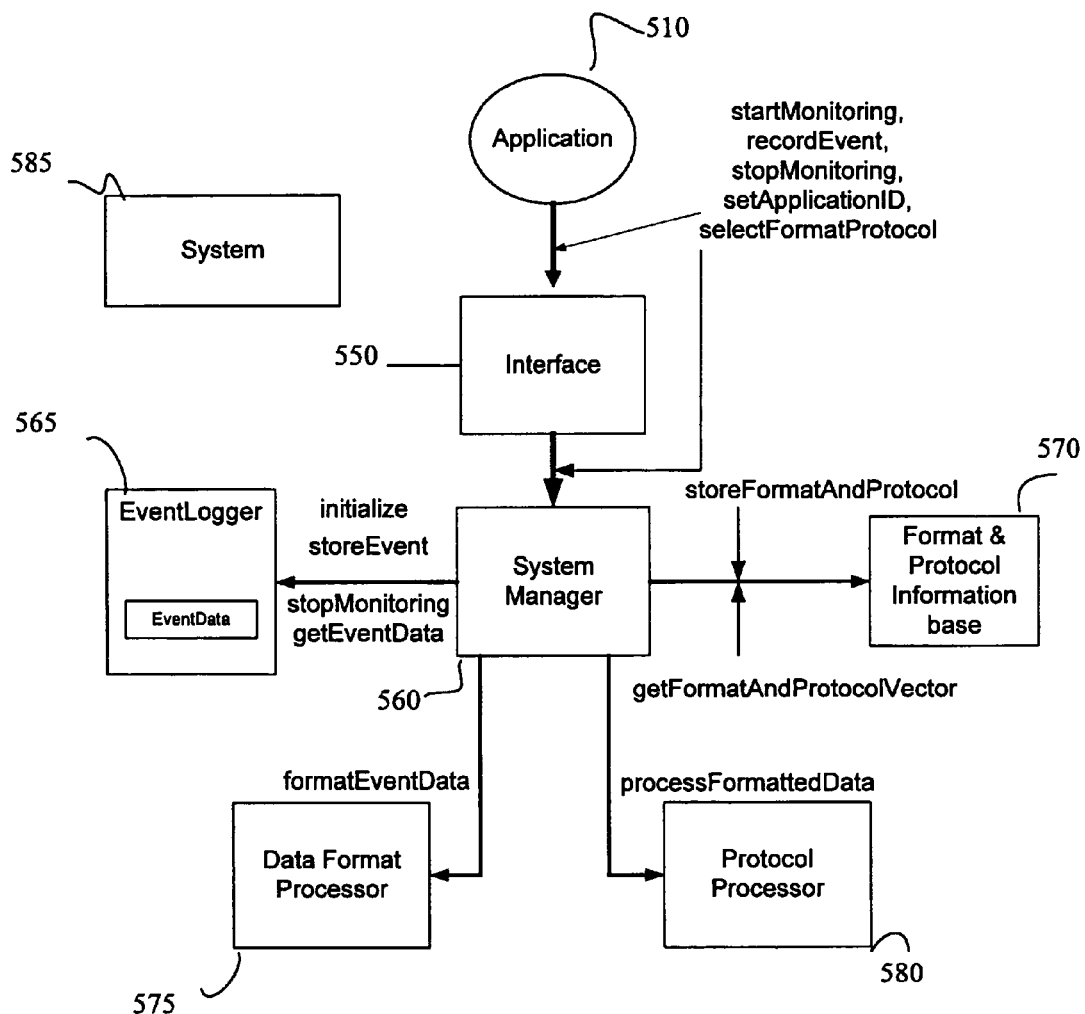
FIG. 12A shows the general architecture of the system.

FIG. 12 shows the general event management architecture of the system that can be implemented as any one, or a combination of, a dynamic linked library (DLL), a script, a Java or C++ class, a C library or routine, etc. The remainder of this discussion describes the implementation in terms of a DLL. In general, an application 510 communicates through an interface 550. The interface 550 specifies the API for the event management architecture (e.g., how information is passed via a C function call to the object(s) in the System Manager 560 with the same names). The System Manager computer code device 560 manages the behavior of other computer code devices by using appropriate objects and their functions. Similarly, the Event Logger 565 records all the necessary information such as User ID, Application ID, Cumulative Session Number, Start Time, Duration and Sequence of Events with the elapsed times when requested through the system manager 560. The Event Logger supports functions including: initialize( ), storeEvent( ), stopMonitoring( ), and getEventData( ).

The initialize function receives a string parameter for the Application ID. The System Manager 560 calls this function when startMonitoring is called by an application 510. The function sets the Application ID, takes care of the Cumulative number of usages, reads the clock to store the start time in order to compute the elapse time and duration, and sets up the user information by examining the registry.

The initialize function receives a string parameter for the Application ID. The System Manager 560 calls this function when startMonitoring is called by an application 510. The function sets the Application ID, takes care of the Cumulative number of usages, reads the clock to store the start time in order to compute the elapse time and duration, and sets up the user information by examining the registry.

After the application 510 has completed its usage monitoring, it calls the stopMonitoring function so that the duration can be computed. If multiple sessions are stored, this function stops the recording of a corresponding session.

After initialization, the storeEvent( ) function can be called with a string parameter for the Event passed by recordEvent. The EventLogger 565 stores the event string and the elapsed time from the start time (recorded during the initialize( ) function call).

The EventLogger 565 also provides access to a getEventData function. If the stopMonitoring was not previously called (i.e., the current session's duration field is undefined), the monitoring is stopped by calling the stopMonitoring function. The stopMonitoring function computes the duration of the current session. The getEventData function returns an abstract class with the access functions shown in FIG. 12B. The abstract class facilitates extensions for multiple sessions.

The Format And Protocol Information Base System 570 (implemented as any one or a combination of package, DLL, static library, etc.) stores the format and protocol information and checks the combination of formats and protocols to determine the valid combinations. To facilitate the storage process, the storeFormatAndProtocol function accepts two parameters (i.e., one for format and one for protocol). The function checks to ensure that the parameters are a valid combination.

The component 570 also includes a getFormatAndProtocolVector function returns a format and associated vector of protocols. In one embodiment, the function performs error checking. For example, if a protocol allows only one format to be sent, then the format should be the last format in the function call of selectFormatProtocol. The return value is a boolean value where true indicates that valid parameters were returned and false indicates that no more data is available. The return parameters are int and vector of int. The first int refers to the format while the vector of int refers to the vector of protocols for the format. When there is no selectFormatProtocol function call, the getFormatAndProtocolVector returns the default setting. Also would be evident, other collections (e.g., a list template) may be used in place of a vector.

The Data Format Processor 575 is responsible for formatting event data into a specified format. One exemplary function is the formatEventData function that receives a pointer to the abstract class EventData. The return value is a pointer to the abstract class FormattedEventData. Generally, interface to the FormattedEventData abstract class is defined as in FIG. 12C.

The Protocol Processor 580 is responsible for outputting the formatted event data through the specified protocol. In one embodiment, the processor 580 also encrypts the body of message. To output the data, the processFormattedData function is called with an input pointer to the abstract class FormattedEventData. The function returns a boolean value where "true" represents no errors, and "false" represents the existence of an error while processing the formatted data.

The System 585 supplies important information and persistent information across the execution of the DLL. Some of the important information is timer information through the library call. The registry to keep the necessary information is another important component of the System 585. Many registry entries are set up at installation time. An exemplary structure for the registry is:

HKEY_LOCAL_MACHINE--SOFTWARE--RicohMonitor--XXX(ApplicationID)

Where XXX represents the Application ID, the following variables are placed in the registry under XXX tree: CumulativeUsage, UserID, SMTP Server, Recipients, From, FTP Server, FTP User, FTP Password, FTP Target Path etc. In one embodiment, CummulativeUsage is an integer, and the rest of the variables are strings.

Figure 13:
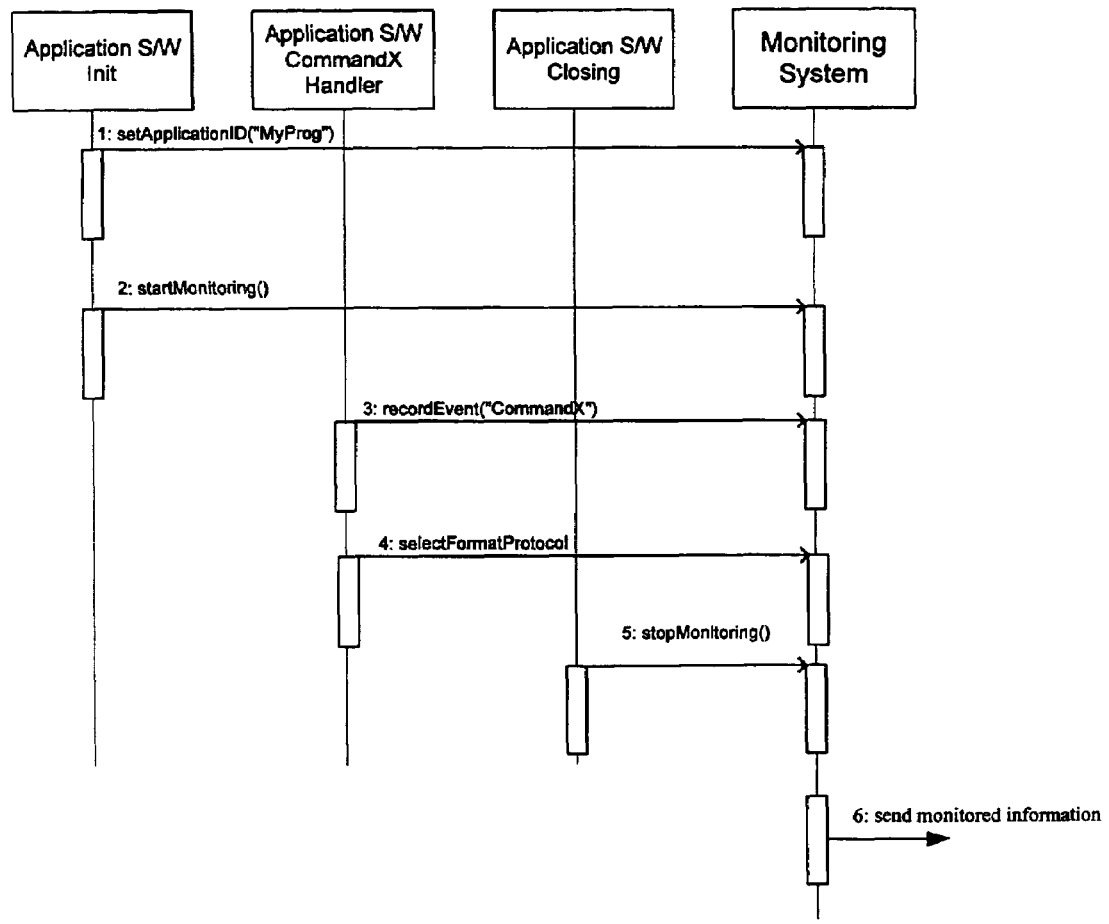
FIG. 13 shows the calling sequence of the interface functions from application software within application unit, appliance or device.

FIG. 13 shows an exemplary calling sequence of various computer code devices according to the present invention. The application software sets up the Application ID and starts the monitoring computer code device. When the events to be monitored happen, the application sends a message to the monitoring computer code device with the event name so that monitoring computer code device will keep track of the name of event and the timing. When the application no longer needs to monitor any activities, the application sends a command to select the format and protocol to be used to send the monitored information. The application then calls the stopMonitoring function, either explicitly or implicitly, as described below. Although FIG. 13 describes sending the monitored information each time an application stops monitoring, in an alternate embodiment, information is sent only upon a secondary event happening (e.g., elapsed time or after a number of events or monitoring sessions have occurred).

Figure 14:
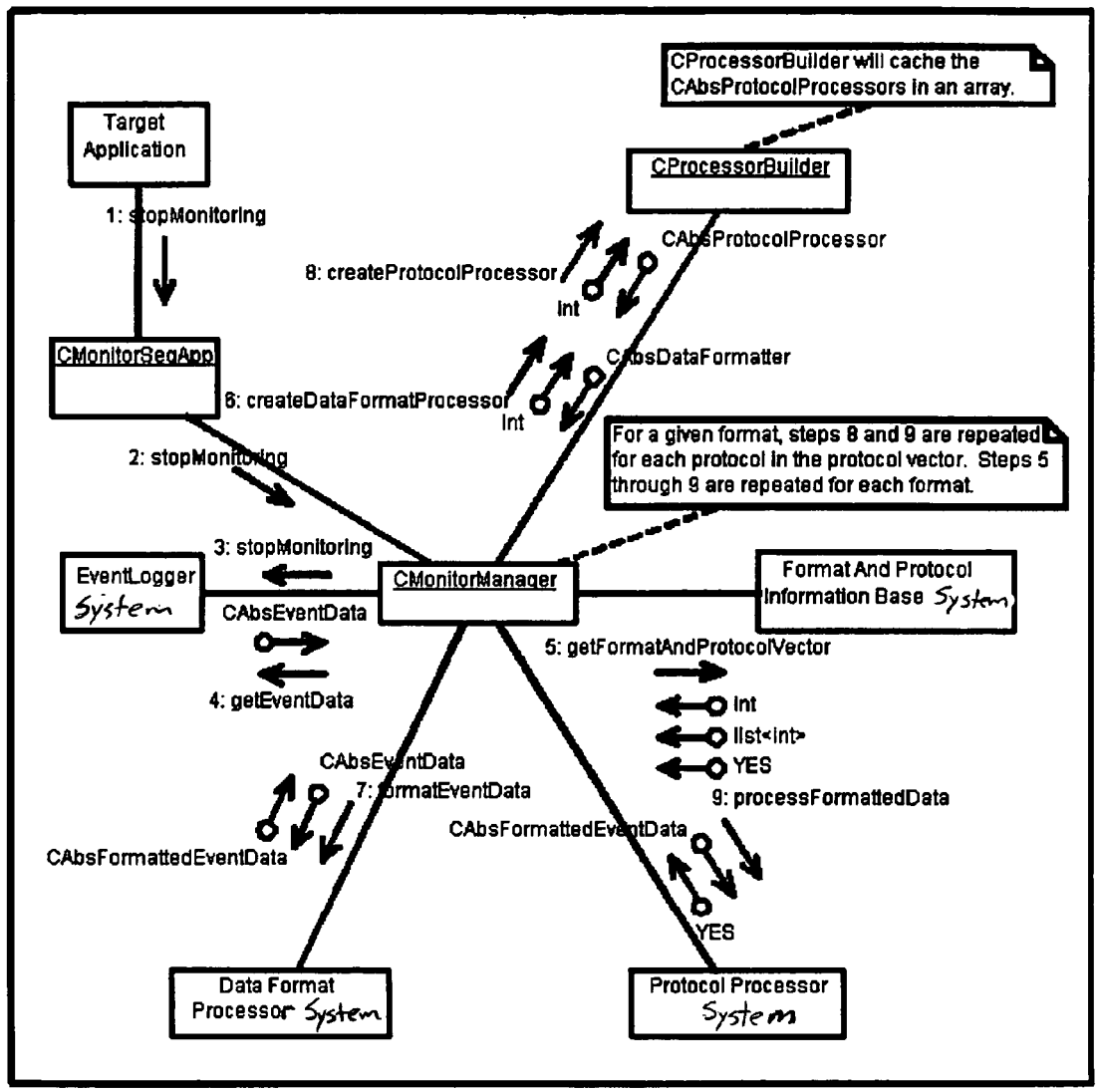
FIG. 14 shows the processing when the Application software instructs DLL to stop monitoring and send the monitored information with the specified format(s) using the specified protocol(s)

FIG. 14 describes the process of sending the monitored information (e.g., when the monitoring stops as shown in FIG. 13). After the stopMonitoring request has propagated from the Target Application (through the CMonitorSeqApp (in step 1)) to the CMonitorManager (in step 2) which passes the request to the EventLogger system (in step 3). The CMonitorManager coordinates subsequent communication between the other computer code devices. The first such communication is in response to a getEventData request made by the CMonitorManager. In step 5, CMonitorManager obtains a format and associated vector of protocols from CformatAndProtocolInformationBase. Later, step 6, entitled "CreateDataFormatProcessor," creates the data formatter for the selected formatting that is used to format the monitored event data in step 7. Step 8 obtains the protocol processor specified by the application software before stopping monitoring. Together, steps 6 and 8 show that the formatters and protocol processors can be created dynamically (i.e., only when they are needed). In addition, created protocol processors can be cached in the CProcessorBuilder.

Figure 15:
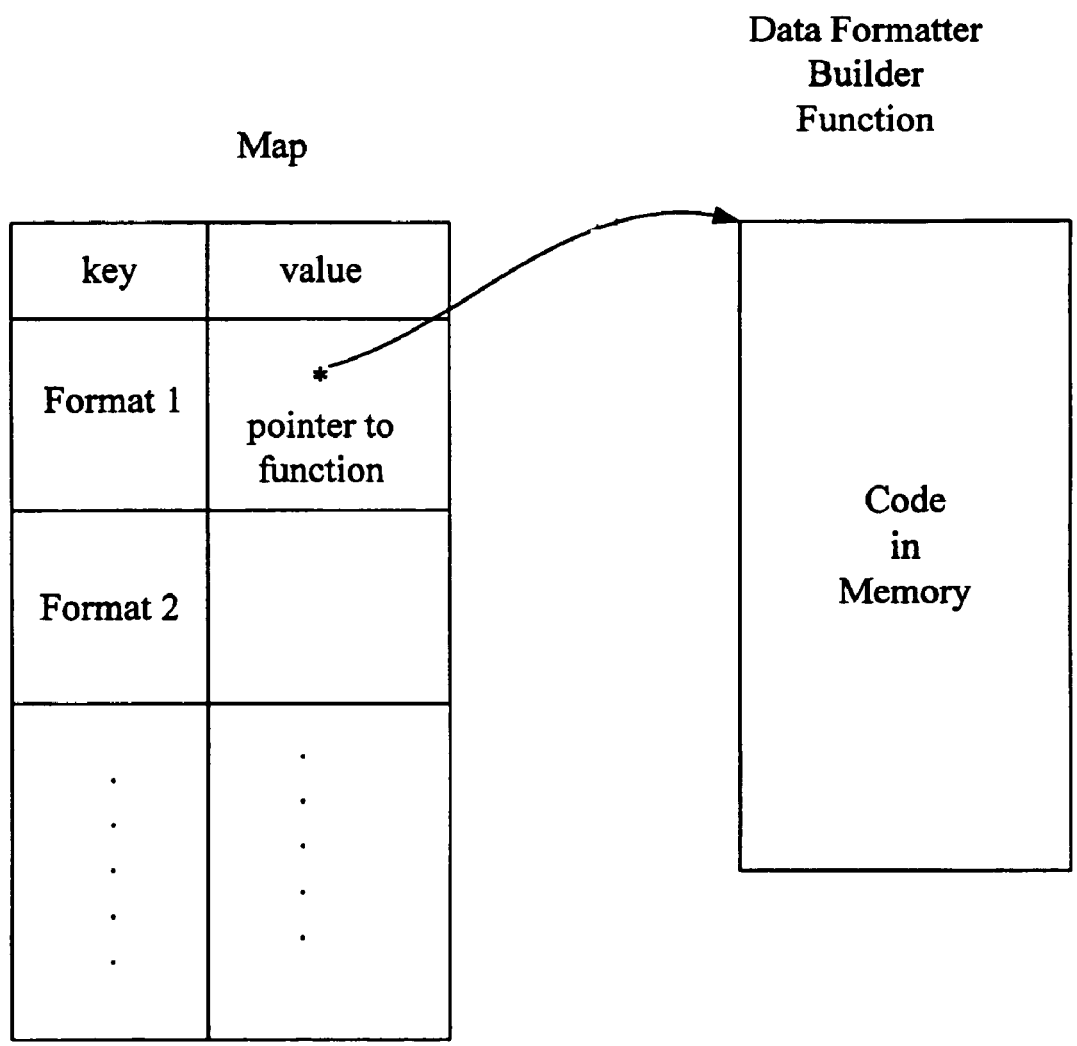
FIG. 15 shows the data structure used for intelligent formatting.

FIG. 15 shows the map data structure used for creating the DataFormat Processor. A map includes at least one (key, value) pair. By using a key (corresponding to one of the possible data formats) as an index value into the map, the system selects a corresponding pointer to a function that creates the data formatter that will transform the monitored event data into the specified data format. When the specified format is sent to the ProcessorBuilder in FIG. 14, the corresponding value in the map for the format is the function pointer to create the formatter. The function pointed by the pointer is to create the requested data formatter. Therefore, the formatter itself is not actually created until the function pointed to by the pointer is executed. In addition, the class returned by this function is the abstract class entitled "data formatter." Accordingly, the user of the class does not need to know the details of the returned formatter, just the abstract class that defines its basic functions.

FIGS. 16A and 16B are exemplary code embodiments corresponding to the FIG. 14. Step 4 in the source code correspond to getting the specified formatter (step 6 of the FIG. 14) while step 5 of the source code formats the data (step 7 of the FIG. 14).

While the above discussion has generally focused on using a single protocol and/or a single data format, in an alternate embodiment, the present invention utilizes plural protocols and/or plural data formats. Those protocols and formats can include, but are not limited to any of the protocols and formats discussed herein. Exemplary formats include, but are not limited to, uncompressed or compressed versions of any one of: un-delimited text, SGML, XML, HTML, csv format, and binary. This enhances the number of possible ways that data can be transferred to support the monitoring of the present invention. Accordingly, one implementation of the application sends at least one (format, protocol) pair to be used by the computer code device (e.g., DLL). The computer code device checks that each pair is valid before storing it in the data structure of two maps. For example, if the format specifies the binary encoding of fixed format, but the protocol is SMTP with the plain text encoding in the mail body, the format and protocol are not a valid pair/combination. Before the monitored data are sent out, the computer code device checks if a selected protocol is restricted to support only one format. Two maps are used for this purpose. Then, the system utilizes the specified data format one at a time to generate the required format and sends out the generated data over all the protocol specified for this data format.

The present invention is also applicable to implementations where two different kinds of parameters are specified multiple times where the first parameter processing is more costly than the second parameter processing. In addition, the some second parameter values may be restricted to supporting only one first parameter value that is specified last. In such a case, the present invention technique can be utilized to process the system efficiently.

Figure 17:
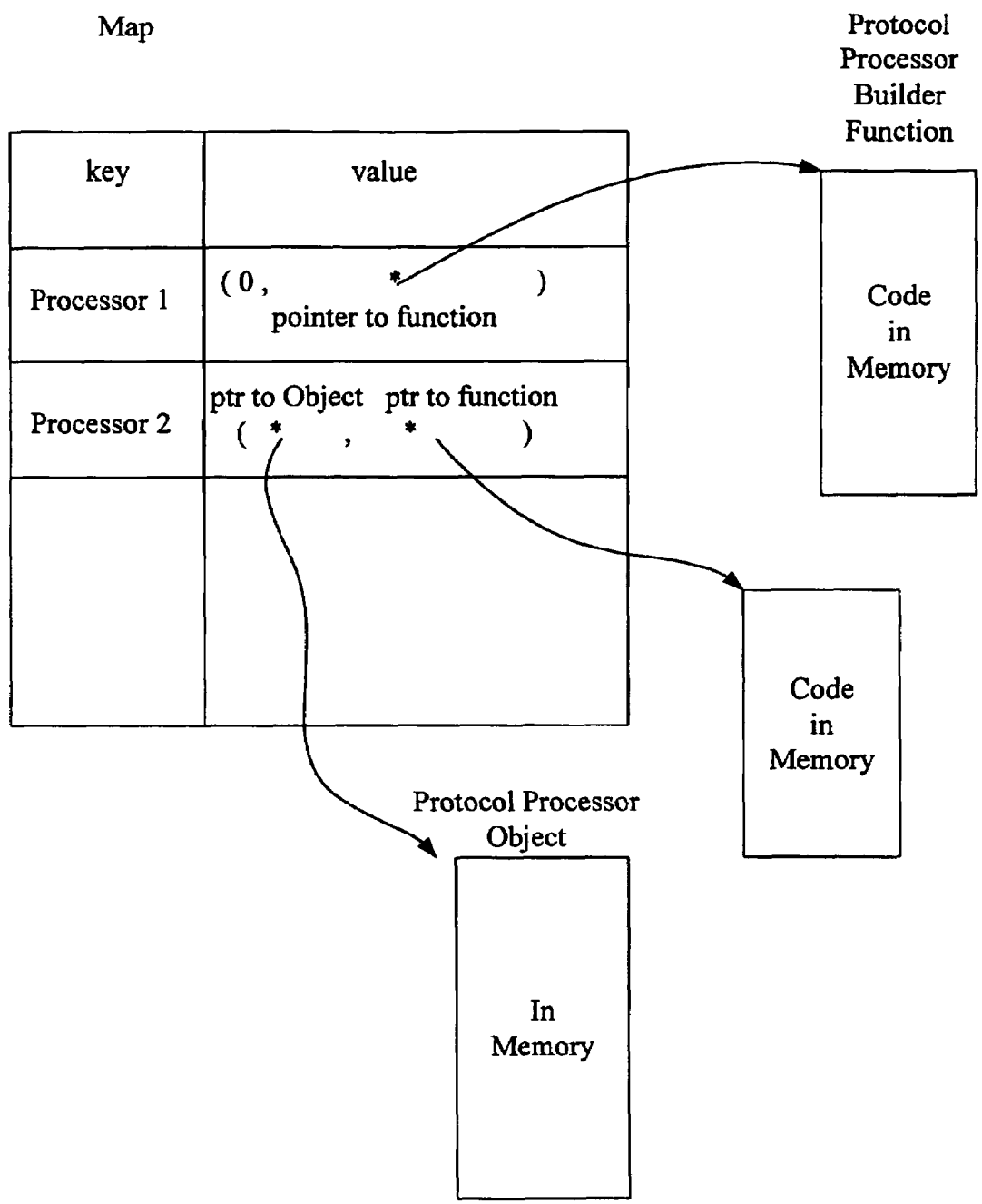
FIG. 17 shows the data structure to handle the intelligent protocol processing with caching of the processing function.

FIG. 17 shows the map data structure (using (key, value) pairs) used for creating and caching the protocol processor. In one embodiment, for a given formatted event data, multiple protocols may need to send the same event data. Likewise, the same protocol may be requested to send the same data using different data formats. As discussed above, the key of each pair specifies a protocol (e.g., SMTP, FTP or HTTP) to be used. The value of the map is itself a second pair (x,y), where x is a pointer to the protocol processor object, and where y is a pointer to the function that creates the protocol processor. This map is initialized to contain the keys and values with the x value being assigned a flag value (e.g., zero). When a particular protocol is requested, the x value corresponding to the specified key is checked. If the x value is zero, the function pointed to by y value is executed. That execution creates the protocol processor, and the pointer to the created object is stored in the x value. Then, the newly created or subsequently stored pointer to the object is then returned as a pointer to the abstract class. Step 6 of FIGS. 16A and 16B (corresponding to step 8 of FIG. 14) illustrates an exemplary code fragment that calls the createProtocolProcessor function. The createProtocolProcessor function returns a pointer to the abstract protocol processor object (identified by the return type "CAbsProtocolProcessor *"). Step 7 of FIG. 16B (corresponding to the step 9 of FIG. 14) shows sending monitored information in a requested format.

FIG. 18A shows the function list and the attributes of the CProcessorBuilder Class according to one embodiment of the present invention. The public function createDataFormatProcessor receives the specification for the Data Formatter and returns the pointer to the specified Data Formatter object in the abstract class type. The public function createProtocolProcessor function receives the specification for the Protocol Processor and returns the pointer to the specified Protocol Processor in the abstract class type. The m_pDataFormatter attribute of the class is used to cache the specified data formatter in the class. The other two map attributes show the structure shown in the FIGS. 15 and 17. The function definition section shows the steps used by the various functions declared in the function list.

Figure 19:
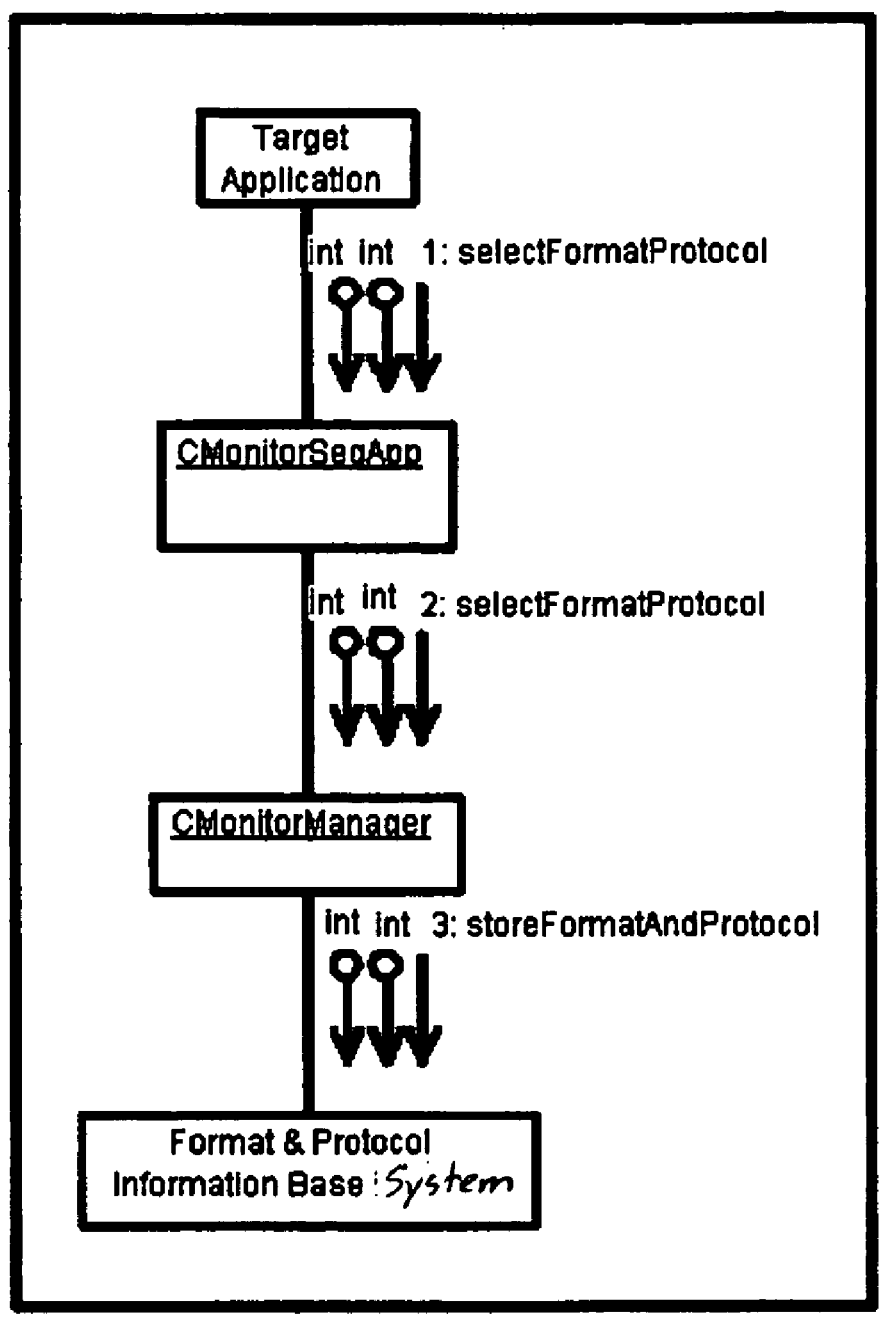
FIG. 19 shows the processing when the Application software instructs the system to use the specified format and protocol to transmit the monitored data.

FIG. 19 illustrates three exemplary steps that pass the format and protocol parameters from the Target Application to the Format and Protocol Information Base System to enable plural protocols and/or formats to be used. Similar to transferring a stopMonitoring request in FIG. 14, FIG. 19 shows how a selectFormatProtocol request is passed from the Target Application through the CMonitorSeqApp to the CMonitorManager. The CMonitorManager converts the request into a storeFormatAndProtocol request that is passed on to the Format and Protocol Information Base System, thereby storing the format and protocol information. Although the parameters are illustrated as integers, any type can be used that uniquely specifies the format and protocol. As would be evident, the functions can return either nothing or an error code.

Figure 20:
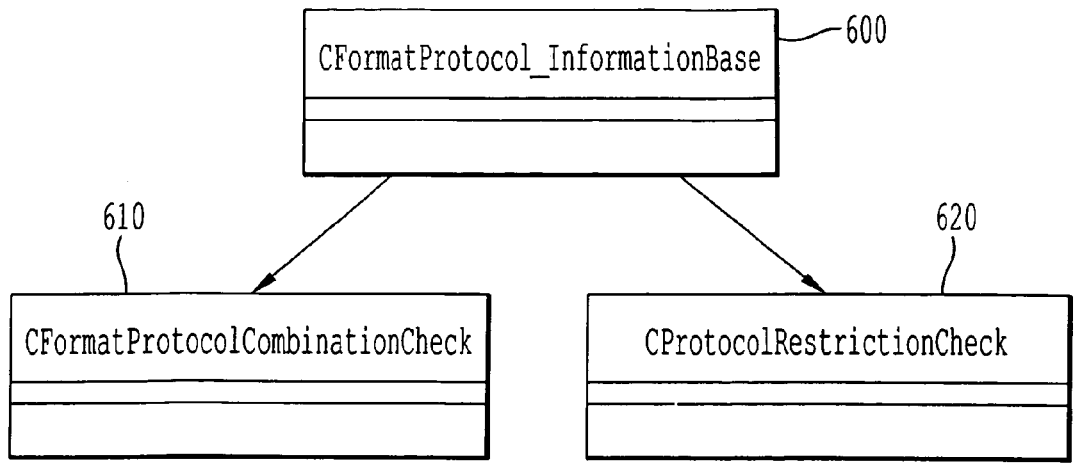
FIG. 20 shows the class structure to keep track of the combination of format and protocols.

FIG. 20 shows relationships of the CFormatProtocolCombinationCheck class 610 and the CProtocolRestrictionCheck class 620 used within the Format And Protocol Information Base System. Generally, the CFormatProtocol_InformationBase interface 600 (described in more detail with reference to FIGS. 23A and 23B) keeps track of the specified formats and protocols. That interface 600 uses the (1) CFormatProtocolCombinationCheck class 610 and (2) the CProtocolRestrictionCheck class 620 for (1) verifying requested combinations and (2) checking for restrictions on the protocols, respectively.

Figure 21:
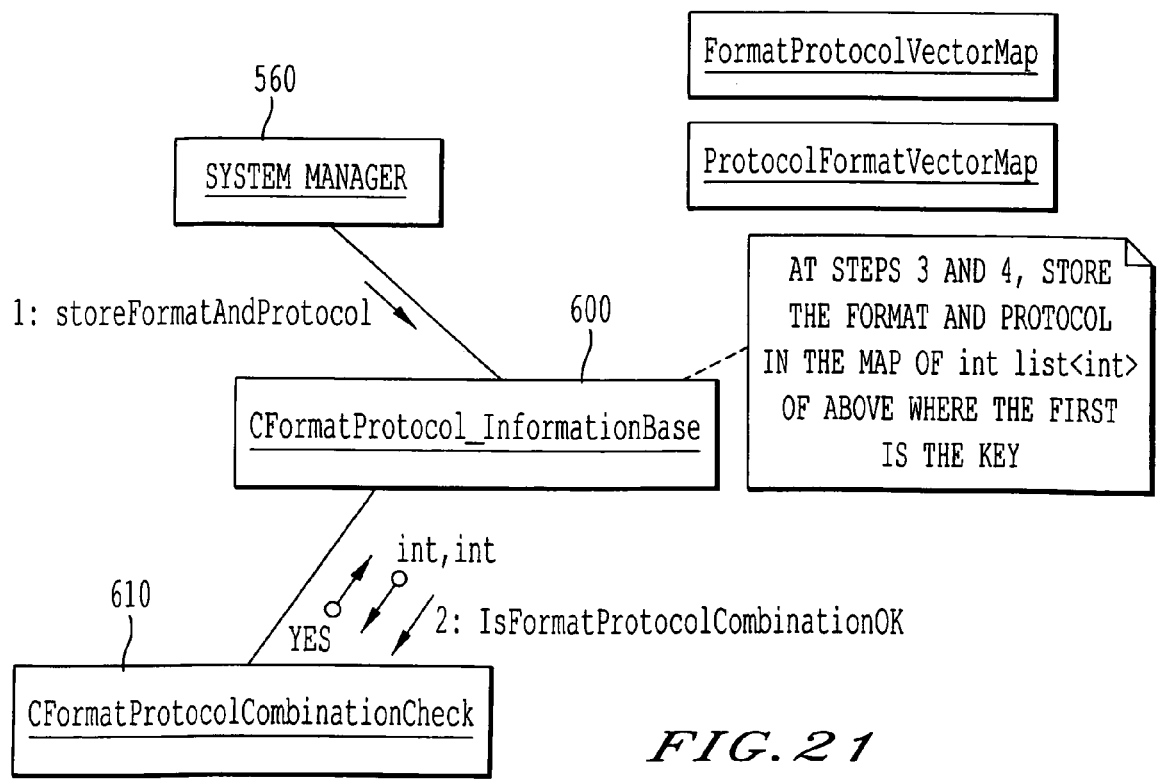
FIG. 21 shows the processing of two parameters passed by the Application software through the System Manager computer code device.

FIG. 21 describes the process by which the system manager 560 verifies whether a specified format and protocol combination is valid. A storeFormatAndProtocol request from the system manager 560 is initially handled by the CFormatProtocol_InformationBase interface 600. Using the relationships illustrated in FIG. 20, that interface 600 converts the request to an is FormatProtocolCombinationOK request that is sent on to the CFormatProtocolCombinationCheck class 610. If that class 610 returns "true," then the combination is valid; otherwise, the class 610 returns false indicating that the combination is invalid. When the combination is valid, the two values are stored into two different maps specified in the FIG. 23A.

Figure 22:
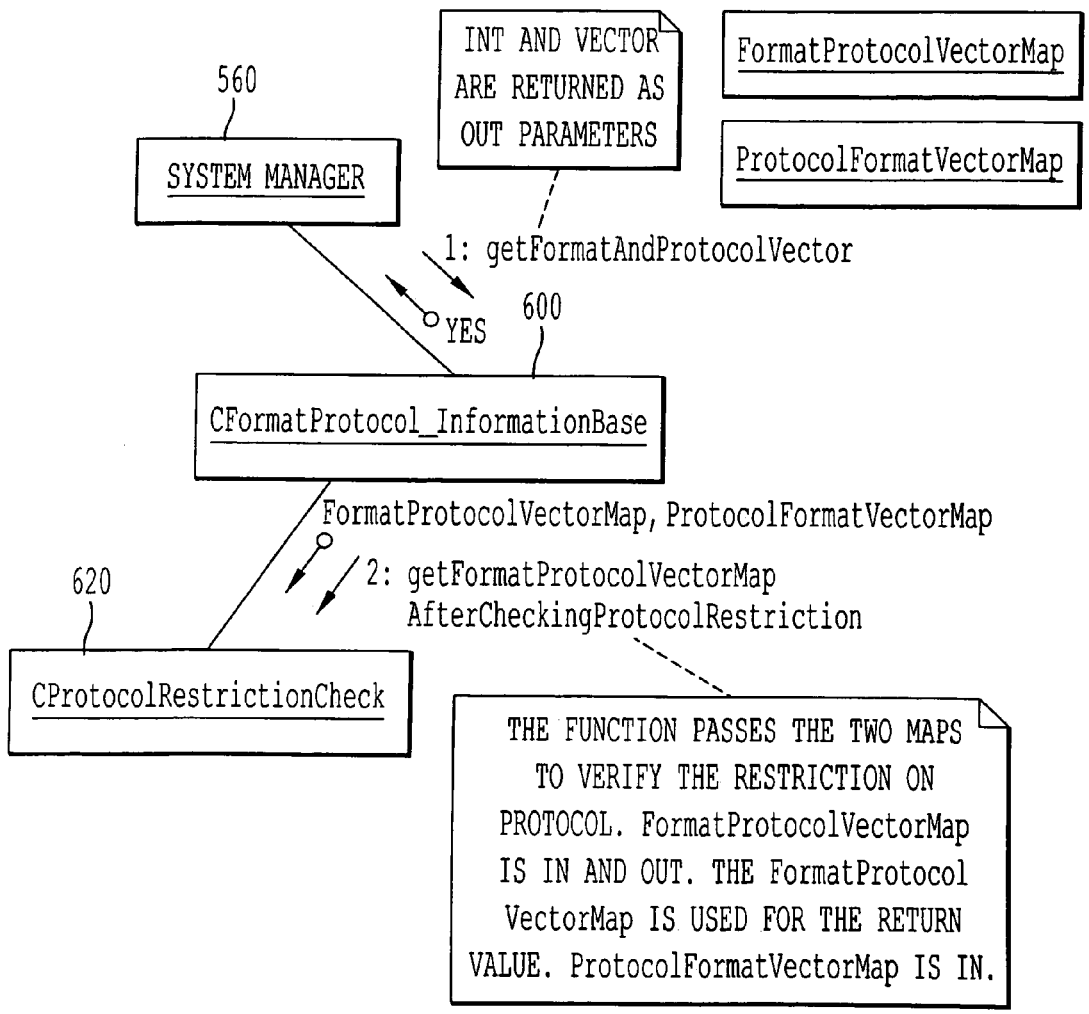
FIG. 22 shows the processing to get a format parameters and associated list of protocols after checking the restriction on the protocol.

FIG. 22 describes the process of returning the format and list of protocols. In FIG. 22, int and vector are exemplary output parameters, but other implementations may use other containers (e.g., the list template of the standard template library) to facilitate the restriction check. Generally, the system manager 560 sends a getFormatAndProtocolVector request to the CFormatProtocol_InformationBase interface 600. Using the relationships illustrated in FIG. 20, that interface 600 converts the request to a getFormatProtocolVectorMapAfterCheckingProtocolRestriction request that is sent on to the CProtocolRestrictionCheck class 620.

FIG. 23A is an exemplary class definition of CFormatProtocol_InformationBase interface/class. The functions, storeFormatAndProtocol and getFormatAndProtocolVector, are public functions used by the System Manager 560 computer code device (an object of CMonitorManager class). Two map structures keep the specified formats and protocols passed through the function, storeFormatAndProtocol, after checking the validity of the combination of the format and the protocol through the object, m_FormatProtocolCombinationCheck of CFormatProtocolCombinationCheck class. The class also contains the object, m_ProtocolRestrictionCheck of CProtocolRestrictionCheck class. The flag, m_bFirstGetCall is used to call the function in the m_ProtocolRestrictionCheck when the function getFormatAndProtocolVector is called for the first time. The attribute, m_FormatProtocolVectorMapIterator, is used by the getFormatAndProtocolVector function to iterate over the m_FormatProtocolVectorMap. FIG. 23B shows the steps for three main functions in the CFormatProtocol_InformationBase class 600.

FIGS. 24A and 24B show the class definition of CFormatProtocolCombinationCheck class 610. The main responsibility of the class 610 is to check whether a specified format and protocol combination is valid. The map, m_CombinationMartix, contains the information of the valid combination that is initialized by the function initMatrix.

FIGS. 25A, 25B, and 25C show the class definition of the CProtocolRestrictionCheck class 620. The m_bOneFormatRestriction attribute specifies whether the information is restricted to a single format. Other types of restrictions could be implemented by adding other private functions and attributes. An exemplary restriction algorithm for the present invention is illustrated in FIGS. 25B and 25C (showing the steps in the private function oneFormatRestriction).

Obviously, numerous modifications and variations of the present invention are possible in light of the above teachings. It is therefore to be understood that, within the scope of the appended claims, the invention may be practiced otherwise than as specifically described herein.

What is claimed is:

1. A method of a monitoring system for monitoring events of a target application in a device, the method comprising:
   monitoring, by the monitoring system of the device, data of the events sent by the target application based on a monitoring command received from the target application;
   generating, by the monitoring system, a log of the monitored data;
   selecting a first protocol from plural Internet application layer protocols to transfer the log of the monitored data by a communication unit based on a protocol selection command received from the target application; and
   transferring the log of the monitored data between a remote receiver and the communication unit through the first protocol; and
   wherein the monitoring, generating, selecting and transferring steps are initiated internal to the device.

2. A method of monitoring events of a target application in a device according to claim 1, wherein the target application is a software program being executed under control of a user.

3. A method of monitoring events of a target application in a device according to claim 1, wherein the target application controls an operation panel.

4. A method of monitoring events of a target application in a device according to claim 1, wherein the target application monitors an internal state change.

5. A method of monitoring events of a target application in a device according to claim 1, wherein the device is an image forming device.

6. A method of monitoring events of a target application in a device according to claim 1, wherein the device is an appliance.

7. A method of monitoring events of a target application in a device according to claim 5, wherein the image forming device comprises at least one of a copying machine, printer, facsimile or scanner.

8. A method of monitoring events of a target application in a device according to claim 1, wherein the first protocol comprises at least one of SMTP, FTP and HTTP.

9. A method of monitoring events of a target application in a device according to claim 6, wherein the appliance comprises at least one of a microwave oven, VCR, digital camera, cellular phone, image output device and palm top computer.

10. An image output device, comprising:
    a target application configured to send events of the target application to a monitoring system; and
    the monitoring system including a processor configured to monitor data of the events sent by the target application based on a monitoring command received from the target application, to generate a log of the monitored data, to select a first protocol from plural Internet application layer protocols to transfer the log of the monitored data by a communication unit based on a protocol selection command received from the target application, and to transfer the log of the monitored data between a remote receiver and the communication unit through the first protocol.

11. A method of monitoring events of a target application in a device according to claim 1, wherein the monitoring step comprises monitoring the data of the events sent by the target application through an interface communicatively coupled between the target application and the monitoring system.

12. An image output device according to claim 10, wherein the target application is configured to send the events of the target application to the monitoring system through an interface communicatively coupled between the target application and the monitoring system.

* * * * *